(12) United States Patent
Arnold

(10) Patent No.: US 7,182,370 B2
(45) Date of Patent: Feb. 27, 2007

(54) HEIGHT ADJUSTER OR ADJUSTABLE TURNING LOOP

(75) Inventor: David R. Arnold, Macomb, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 359 days.

(21) Appl. No.: 10/843,121

(22) Filed: May 11, 2004

(65) Prior Publication Data

US 2004/0207191 A1 Oct. 21, 2004

Related U.S. Application Data

(63) Continuation-in-part of application No. 10/408,622, filed on Apr. 7, 2003, now Pat. No. 6,733,041.

(60) Provisional application No. 60/430,254, filed on Dec. 2, 2002, provisional application No. 60/379,912, filed on May 13, 2002.

(51) Int. Cl.
*B60R 22/20* (2006.01)

(52) U.S. Cl. .................................. 280/801.2

(58) Field of Classification Search ............. 280/801.1, 280/801.2, 808, 804; 297/483
See application file for complete search history.

(56) References Cited

U.S. PATENT DOCUMENTS

| | | | |
|---|---|---|---|
| 4,042,264 A | 8/1977 | Shumer | 269/88 |
| 4,470,618 A | 9/1984 | Ono | 280/808 |
| 4,552,408 A | 11/1985 | Ono | 297/483 |
| 4,926,722 A | 5/1990 | Sorensen et al. | 81/487 |
| 5,009,134 A | 4/1991 | Sorensen et al. | 81/487 |
| 5,022,137 A | 6/1991 | Sorensen et al. | 29/559 |
| 5,149,136 A | 9/1992 | Maekawa et al. | |
| 5,482,325 A | 1/1996 | Moeller et al. | |
| 5,931,502 A | 8/1999 | Frank et al. | |
| 6,478,334 B1 | 11/2002 | Desmarais et al. | 280/805 |
| 6,733,041 B2* | 5/2004 | Arnold et al. | 280/801.2 |
| 6,802,537 B1* | 10/2004 | Tolfsen et al. | 280/801.2 |
| 6,997,479 B2* | 2/2006 | Desmarais et al. | 280/801.2 |
| 7,021,662 B2* | 4/2006 | Hoffmann et al. | 280/801.2 |

(Continued)

FOREIGN PATENT DOCUMENTS

DE 37 37 974 A1 5/1989

(Continued)

*Primary Examiner*—Faye M. Fleming
*Assistant Examiner*—Barry Gooden, Jr.
(74) *Attorney, Agent, or Firm*—Markell Seitzman

(57) ABSTRACT

A height adjuster (100, 200, 400) for a seat belt system comprising a mounting bar (102, 202, 402), a carrier (120, 220, 460, 460a) and a spring-loaded locking lever (170, 270, 490). The mounting bar is preferably oval or rectangular in cross-section with at least one wall (side wall), which acts as an engagement or locking surface. The engagement surface can include a plurality of small teeth. The bar is adapted to be mounted to a support surface or structure. The carrier is slidably mounted on the bar and is movable to different positions. The carrier includes a main portion, which may be U-shaped in cross-section with a top, a bottom and a center wall. Each of the top and bottom walls includes a first opening through which the mounting bar extends. A friction coupling (480) can automatically move the locking lever to its free position without manual intervention.

18 Claims, 20 Drawing Sheets

U.S. PATENT DOCUMENTS

| | | |
|---|---|---|
| 2003/0209899 A1 | 11/2003 | Arnold et al. |
| 2004/0239094 A9 * | 12/2004 | Herrmann et al. ........... 280/808 |
| 2005/0023815 A1 * | 2/2005 | Hoffmann et al. ....... 280/801.2 |
| 2005/0167971 A1 * | 8/2005 | Desmarais et al. ...... 280/801.2 |

FOREIGN PATENT DOCUMENTS

| | | |
|---|---|---|
| EP | 0 187 225 A | 7/1986 |
| EP | 191405 A2 | 8/1986 |
| GB | 2 230 936 A | 11/1990 |
| GB | 2230936 A | 11/1990 |
| WO | WO 03/097408 A | 11/2003 |

* cited by examiner

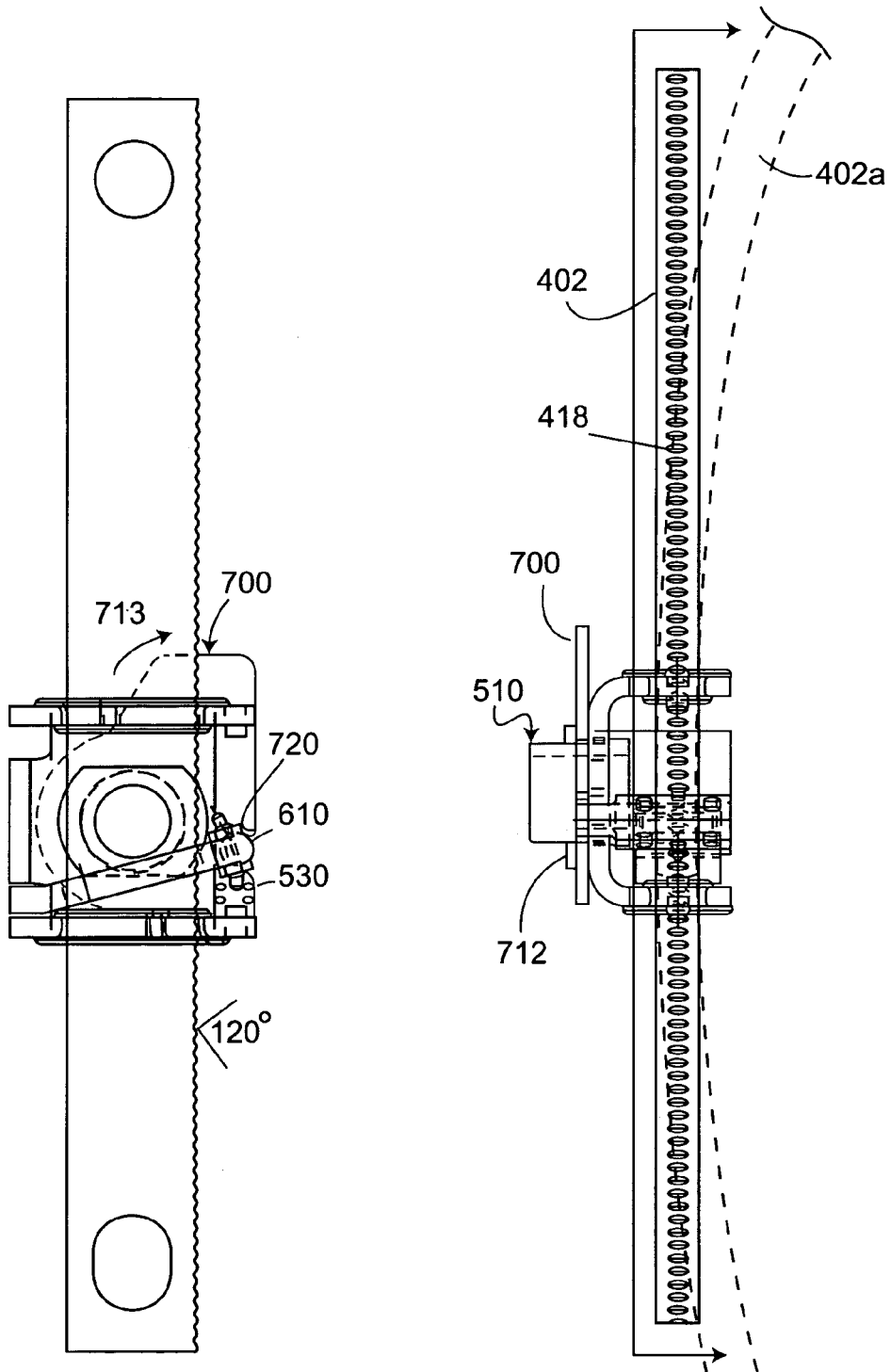

HEIGHT ADJUSTER OR ADJUSTABLE TURNING LOOP

BACKGROUND AND SUMMARY OF THE INVENTION

This application claims the benefit of U.S. Provisional Application 60/379,912, filed on May 13, 2002 and 60/430,254, filed on Dec. 2, 2002 and patent application Ser. No. 10/408,622, filed on Apr. 7, 2003 now U.S. Pat. No. 6,733,041. The disclosures of the above applications are incorporated herein by reference.

The present invention generally relates to a height-adjusting mechanism (height adjuster) for a D-ring (also called a web guide) of a seat belt system.

The shoulder belt 560 of a three-point seat belt system 562 is typically supported at or about shoulder level of the occupant by a web guide or D-ring 500 as generally illustrated in FIG. 21. The seat belt system also includes a seat belt retractor 561 operatively connected to the shoulder belt 560 and a lap belt 564 with a tongue 566, which is lockable within a buckle 568. The lap belt and buckle are appropriately anchored to the floor or seat frame. In some vehicles, the web guide is an integral part of the vehicle seat, while in others it is attached to one of the pillars (such as the B, C, or D-pillar) of the vehicle generally identified by numeral 570. The web guide or D-ring 550 is typically constructed to provide a support surface, formed as a slot, over which the shoulder belt slides and the web guide includes means for mounting the D-ring to the seat or pillar. D-rings may also include a decorative cover 572. U.S. Pat. No. 5,601,311 is illustrative of a simple web guide. It is now commonplace to mount the web guide on a vertically adjustable mechanism 574, which is typically called a height adjuster or an adjustable turning loop (ATL). U.S. Pat. Nos. 5,050,907 and 5,230,534 are illustrative of this type of adjustable mechanism and are incorporated herein by reference.

In most height adjusting mechanisms the D-ring is attached to a carrier. The carrier is manually moveable to a desired position by the occupant of the vehicle. The carrier often slides upon a rail or track and the carrier includes a lock or detent mechanism, which will lock the carrier at the desired vertical location as chosen by the occupant. At the new location, the shoulder belt crosses the occupant's body at a more comfortable location.

An inspection of many of the existing height adjusting mechanisms shows a rail that is often a complex and expensive part, and made using, many machining operations. Similarly, the carrier and locking mechanism are also relatively complicated mechanisms.

It is an object of the present invention to provide an improved height adjusting assembly.

Accordingly the invention comprises: a height adjuster for a seat belt system comprising a mounting bar, a carrier and a spring-loaded locking lever. The mounting bar is preferably oval or rectangular in cross-section with at least one wall (side wall), which acts as an engagement or locking surface. The engagement surface can include a plurality of small teeth. The bar is adapted to be mounted to a support surface or structure. The carrier is slidably mounted on the bar and is movable to different positions. The carrier includes a main portion, which may be U-shaped in cross-section with a top, a bottom and a center wall. Each of the top and bottom walls includes a first opening through which the mounting bar extends.

The spring-loaded locking lever (lock bar) is movable from a locking position in which it engages the engagement surface of the mounting bar to a free or unlocked position. The locking lever includes a base portion and a lever (activation lever) portion, which extends from the base portion at a pre-set angle. In one embodiment of the invention the carrier includes a side, which extends from the center wall of the carrier. The carrier can be configured to have the locking lever pivot slot at the top or bottom of the side or the pivot slot can be located in the center of the side. The locking lever is spring loaded and in one configuration the locking lever is spring loaded by a leaf spring and in another embodiment the locking lever is biased by a coil spring. The locking lever is slidingly mounted on the bar and includes a lock opening in the lever portion thereof. The mounting bar extends through the lock opening and the locking lever includes a first lock edge formed on a corner of the locking lever at the lock opening.

As mentioned, the locking lever is rotatable between a free position and locked or locking position. The locking lever can be manually movable to the free position or can be moved using another force producing mechanism such as a solenoid. The spring urges the locking lever to its locked position. As can be appreciated another force producing mechanism can also be used to move the locking lever to the locked position. In other embodiments the lock lever includes a curved end, which wraps about and rotates relative to various portions of the carrier.

In one embodiment, the carrier further includes a friction coupling, which causes the mounting bar to automatically disengage from the bar when the height adjuster is manually moved in one direction relative to the bar, eliminating the need to manually move the bar to its free or disengaged position. One of benefits provided by this automatic disengagement, arises from the incorporation of the friction coupling of the locking lever from the bar. More specifically, as the height adjuster is moved in this first direction the operation of the height adjuster is quieted, as the lock edge will not skip or bounce upon the typically metal bar. This embodiment also adds a second benefit in that this friction coupler reduces to a minimum, or eliminates entirely, wear on those components required to hold occupant load.

Many other objects and purposes of the invention will be clear from the following detailed description of the drawings.

BRIEF DESCRIPTION OF THE DRAWINGS

FIG. 6 is a side plan view of the height adjuster.

FIG. 7 is a front plan view of the invention.

DETAILED DESCRIPTION OF THE DRAWINGS

Figure 1:
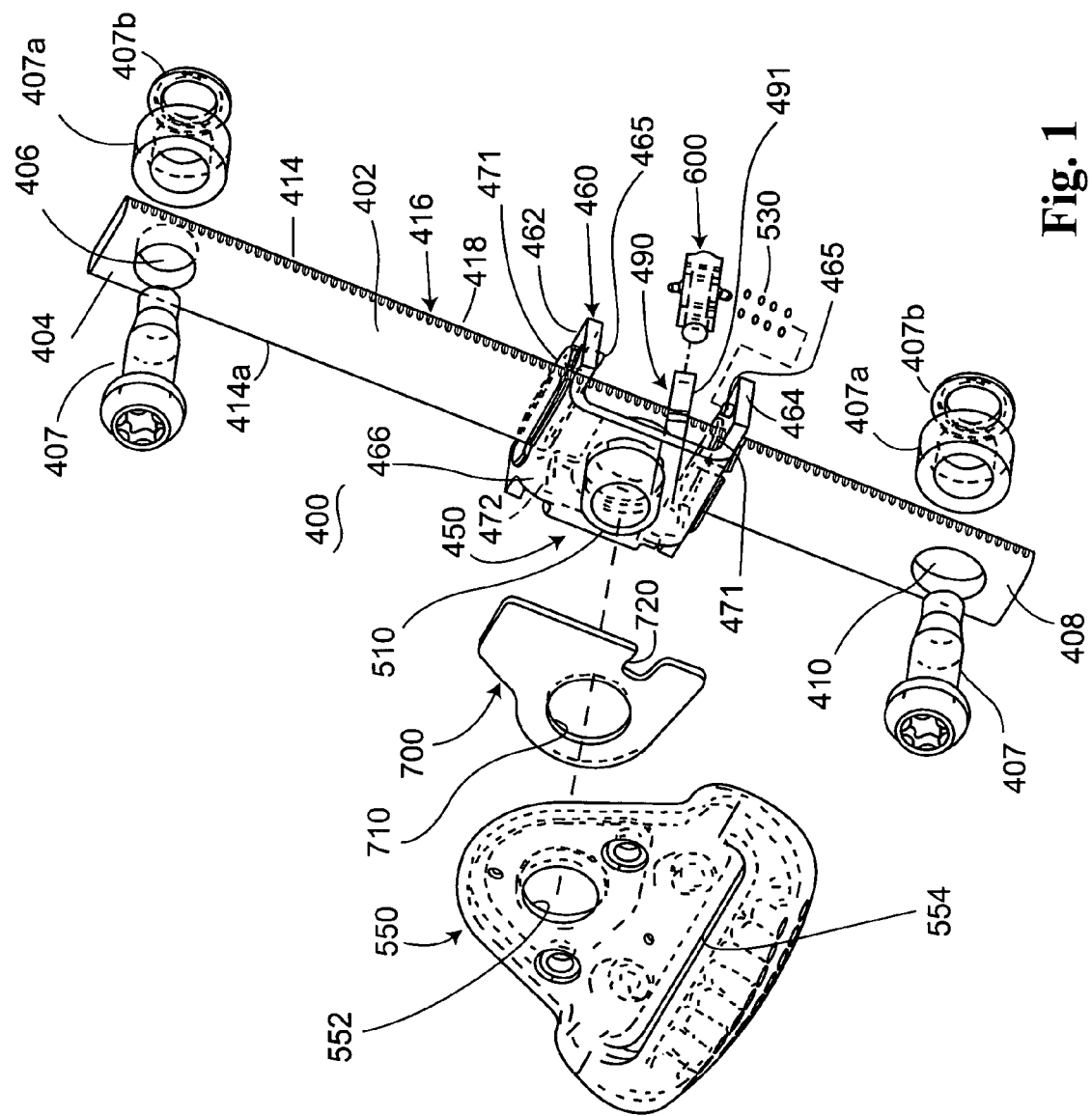
FIG. 1 is a front isometric view of an adjustable web guide or D-ring using the present invention.
Figure 2:
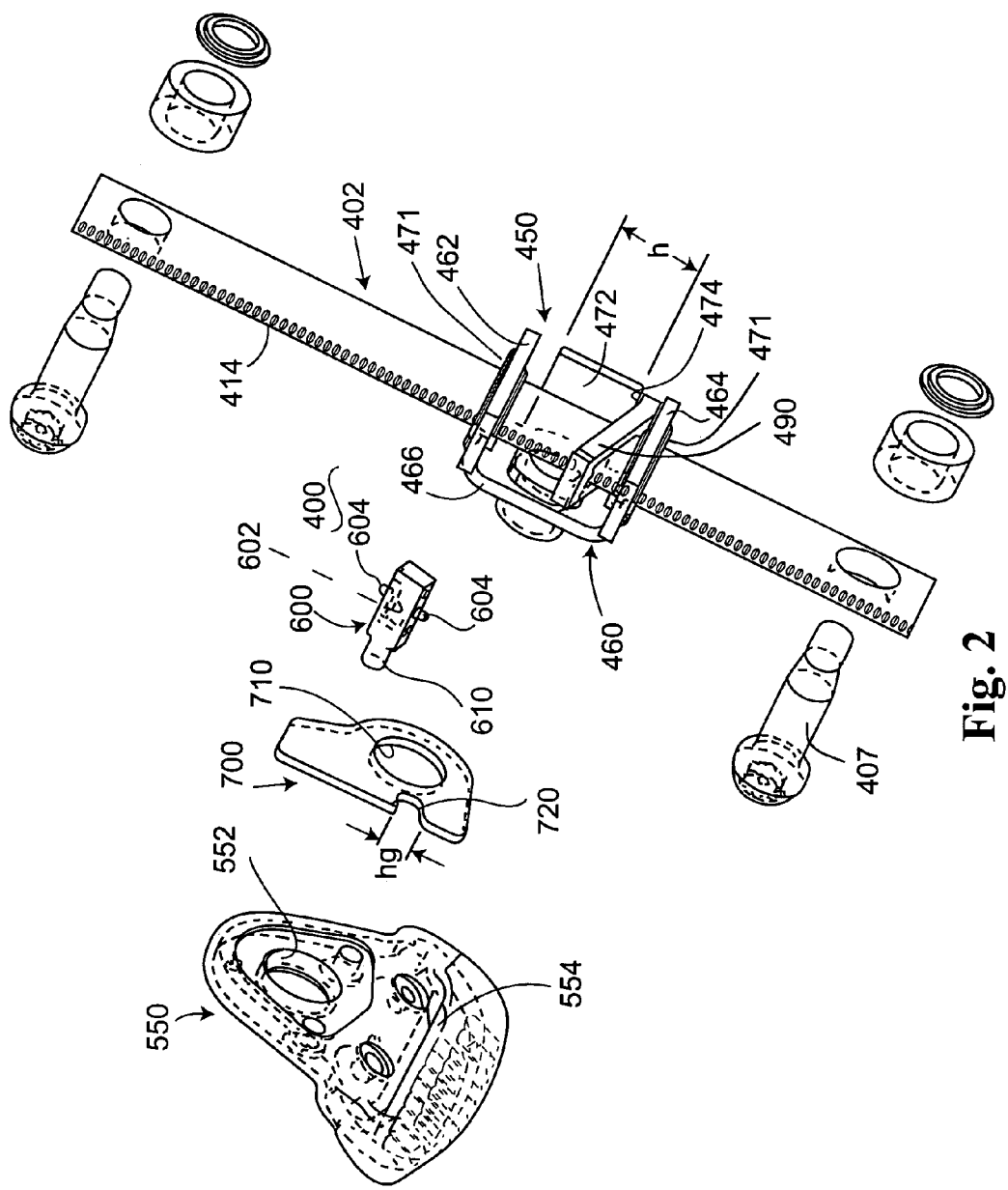
FIG. 2 is a rear isometric view of the device shown in FIG. 1.
Figure 3A:
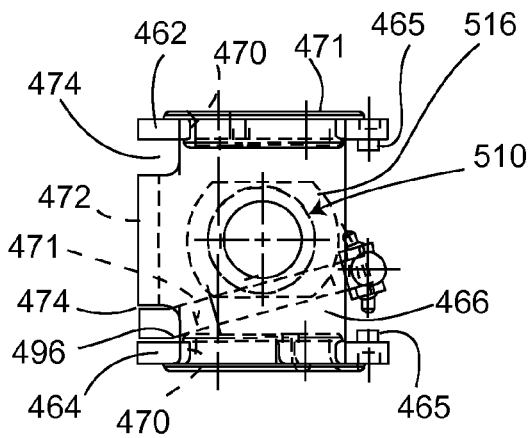
FIGS. 3A–D show various views of a carrier assembly.
Figure 3B:
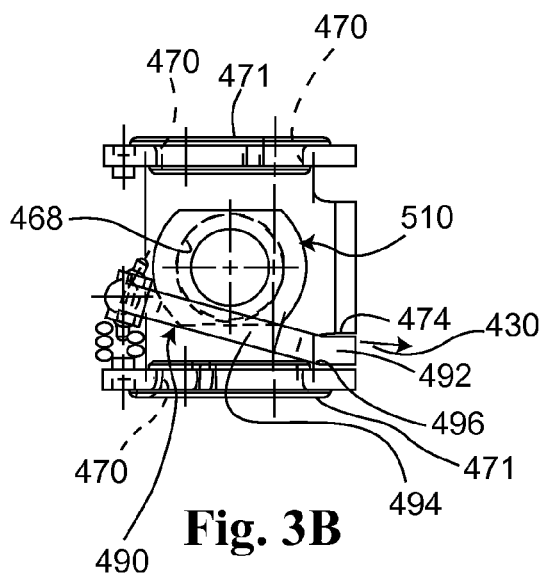
Figure 3C:
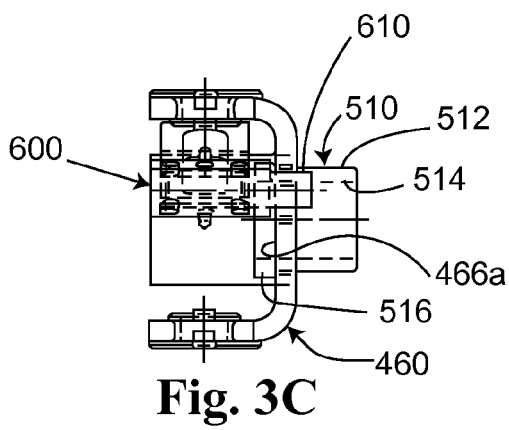
Figure 3D:
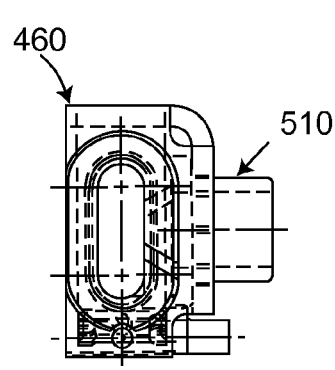
Figure 5A:
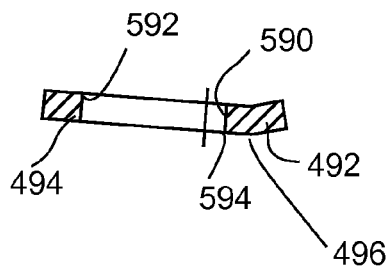
FIG. 5A is a cross-sectional view of the locking lever.
Figure 5:
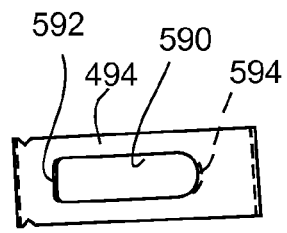
FIG. 5 is a top plan view of a locking lever.

FIGS. 1 and 2 show front and rear views of a height adjuster 400 incorporating the present invention. The height adjuster 400 includes a mounting bar 402 and a carrier assembly 450 and could also include mounting hardware. In the preferred embodiment of the invention the bar 402 is a heat treated steel, which is appropriately coated with a rust preventing agent. The bar is adapted to be mounted to a support surface such as to a portion of a vehicle (a support pillar) or to the frame of a vehicle seat.

By way of illustration, end 404 of bar 402 includes a mounting opening 406 and end 408 includes a mounting opening 410. A respective threaded bolt 407 is received within openings 406 and 410 and a spacer 407a can be used to easily space the rear of the height adjuster 400 from an adjacent mounting surface. A washer 407b can be placed between each spacer 407a and the mounting surface.

The mounting bar 402 includes at least one engagement or locking surface, which can be any of its four sides (front, rear, left side and right side). In this embodiment a first or primary locking surface is formed by the right side (side wall) 414. In the preferred embodiment side 414 includes a set of locking features 416 such as a plurality of vertically spaced teeth, grooves or indentations 418. These teeth are optional but when used increase the load capacity of the height adjuster. If used, the teeth (grooves or indentations) 418 are closely spaced at for example an inter-tooth pitch of about 1–1.5 mm. One of the benefits of using the plurality of teeth is the high number of stable locking positions is significantly more than found in the prior art. The opposite side 414a in the preferred embodiment is smooth but can also include a second plurality of teeth (not shown). The included angle between adjacent surfaces of each tooth (groove or indentation) 418 is approximately 120 degrees. The included angle may be in the range of about 90–120 degrees.

In the preferred embodiment of the invention the cross-sectional shape of the bar is oval or rectangular; an oval cross-sectioned bar is shown in FIGS. 1 and 2.

The carrier assembly 450 includes a carrier 460, a locking lever 490, a lever cap 600, a hollow, threaded fastener 510, a spring 530 and an activation lever 700. A D-ring 550 is secured to fastener 510 with a threaded bolt (not shown).

The carrier 460 is preferably made from a heat treated metal (such as steel) stamping and includes a top 462, a bottom 464 and a front wall, which is also referred to as a center wall 466. Details of the carrier 460 are also shown in FIGS. 3A–3D. The front wall 466 includes an opening 468 (see for example FIG. 3B) into which the threaded fastener 510 is secured; the fastener 510 extends outwardly from the carrier. From the various figures it can be seen the carrier 460 is generally U-shaped. Each of the top and bottom includes an aligned opening 470. As will be seen the bar 402 is slidably received through both the top and bottom openings 470. Each of the openings 470 is configured to closely envelop the four corresponding sides of the bar 402. As mentioned above the carrier 460 and the bar 402 are each made of metal. To avoid the possibility of rattle and noise bushings 471 can be inserted within a corresponding opening 470. The bushings 471, which are hollow, insulate the carrier 460 from the bar 402 and can be made of a polymeric material (including plastic) or an appropriate metal. As can be appreciated the discrete bushings 471 can be eliminated by coating the carrier 460 with a polymeric material; the material is formed into the bushings 471.

As mentioned above, the fastener 510 is received within opening 468 of the carrier 460. Typically fastener 510 would be swaged or otherwise permanently connected to the front wall of the carrier 460. As can be seen from any of the above figures the fastener 510 includes a cylindrical body 512 defining a hollow, threaded bore 514. The fastener 510 includes the rear flange 516, which lies adjacent to a rear surface 466a of the front wall 466 of the carrier 460. A threaded bolt (not shown) for the D-ring or web guide 550 is received within bore 514. The D-ring 550, see FIG. 1, includes an opening 552 through which this threaded fastener extends. The D-ring also includes a narrow slot 554 through which the shoulder belt slides.

Reference is briefly made to the carrier top and bottom, respectively 462 and 464. At least the bottom 464 includes a projection or detent 465, which is used as a post to receive one end of the helical spring 530. The carrier 460 can also be mounted to the bar 402 in a 180 degree rotated configuration. Obviously, this rotation interchanges the location of the parts identified as the top and bottom. In order for the carrier 460 to be usable in this rotated configuration various portions of the carrier have a mirror symmetry, for example, the top 462 may also include an additional projection, detent or post 465. In general, the post 465 provides a spring retaining feature, which can also be achieved by forming a circular cylindrical recess in the bottom and/or top of the carrier 460. The helical, cylindrically shaped spring 530 (FIG. 1) is received in the recess.

The carrier 460 also includes a side (side wall) 472. As more clearly shown in FIGS. 1, 2 and 3A the side 472 integrally extends rearward from the front wall 466 and is generally oriented perpendicular to the top 462, bottom 464 and front wall 466. Additionally, each of the top 462 and bottom 464 integrally extends from the front wall 466 and is oriented generally perpendicularly thereto. As can be seen from FIG. 2 (also FIGS. 3A and 3B) the height, h, of the side 472 does not span the complete distance between the respective inner surfaces of the top 462 and bottom 464. More particularly, the side 472 and top and bottom of the carrier cooperate to provide at least one slot or space (a pivot slot) 474 therebetween. To provide symmetry, the carrier 460 includes two such slots or spaces 474 although only the lower one is used in the illustrated embodiment.

As mentioned above the carrier assembly 450 also includes a locking lever 490. The locking lever, which is also made of heat treated steel, includes a base portion (base) 492 and a lever, lever portion or actuating arm 494, preferably of integral construction. More specifically, the lever 494 is bent upwardly relative to the base 492 at about fifteen degrees. The bend is shown by numeral 496. As can be seen from the various figures the locking lever 490 additionally includes an opening 590 through which the bar 402 extends. The material of the locking lever 490 surrounding the opening 590 is shaped to form a perpendicularly shaped corner or lock edge 592 and generally at the intersection of the opening 590 and a top surface of the locking lever 490. Similarly another sharp corner or locking edge 594 is oppositely formed at the lower intersection of the side of opening 590 with an adjacent bottom surface of the locking lever.

Figure 4:
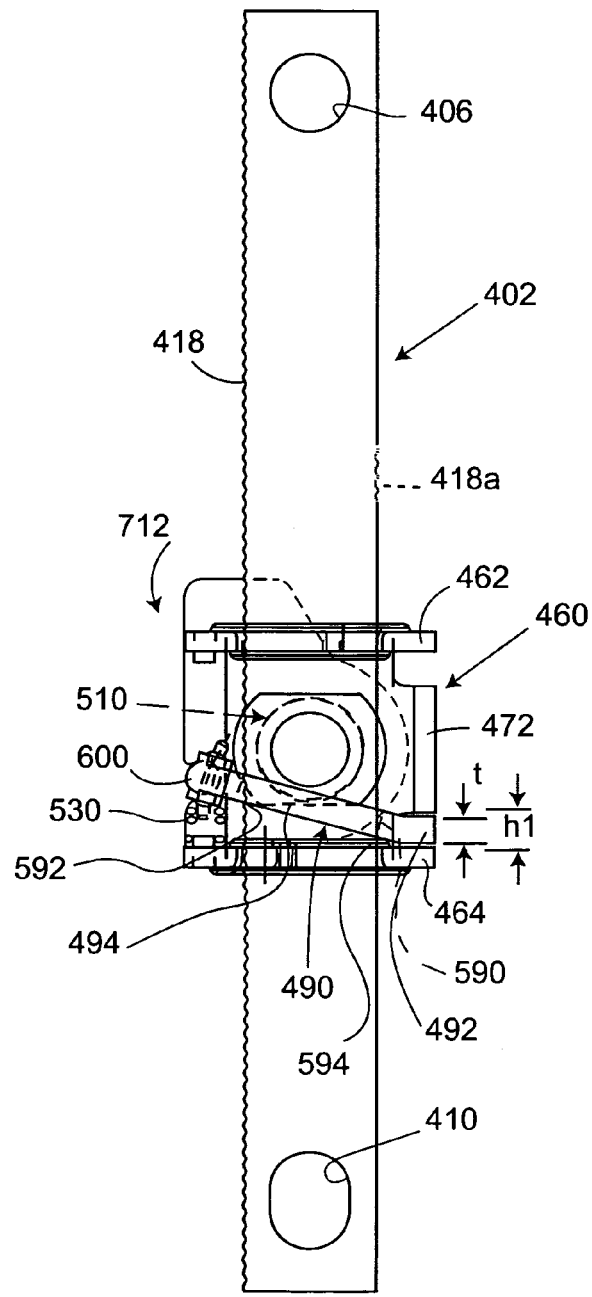
FIG. 4 is a rear plan view of the present invention.

Reference is briefly made to FIG. 4, which illustrates the locking lever 490 in its locked configuration with locking edge 592 in engagement with one of the teeth 418 of the bar 402. The bias spring 530 biases the actuating lever 494 (of the locking lever 490) into this locked position. In this locked position the sharp corner 594 is also biased against the opposing side 414a the bar 402. When loaded, edge 594 impinges on side 414a and adds additional load carrying capacity. The hardness of the locking lever is equal to or harder than the hardness of the bar 402. In the preferred embodiment, as mentioned above, side 414a does not include any discrete locking features such as in the plurality of teeth 418, however, another set of teeth, such as 418a (a portion of which is shown in phantom line), can be formed into side 414a.

Figure 4A:
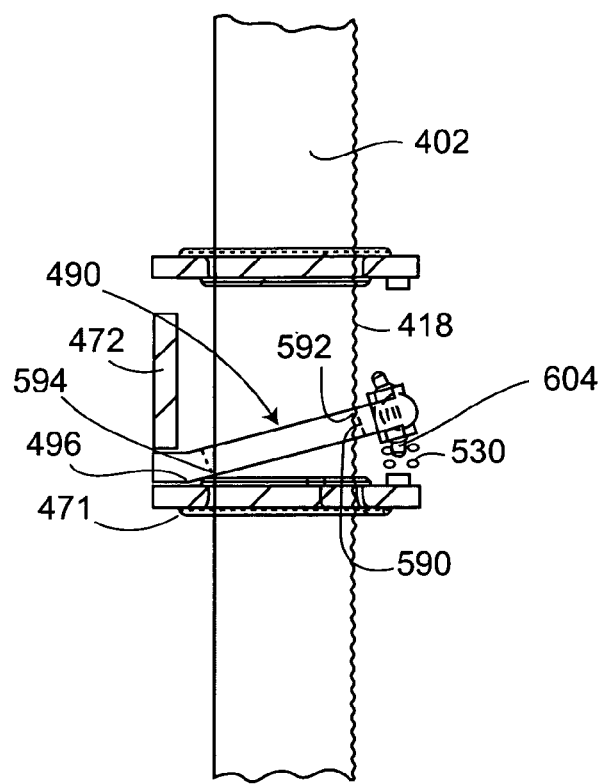
FIG. 4A shows an enlarged view of the height adjuster in its locked position.
Figure 4B:
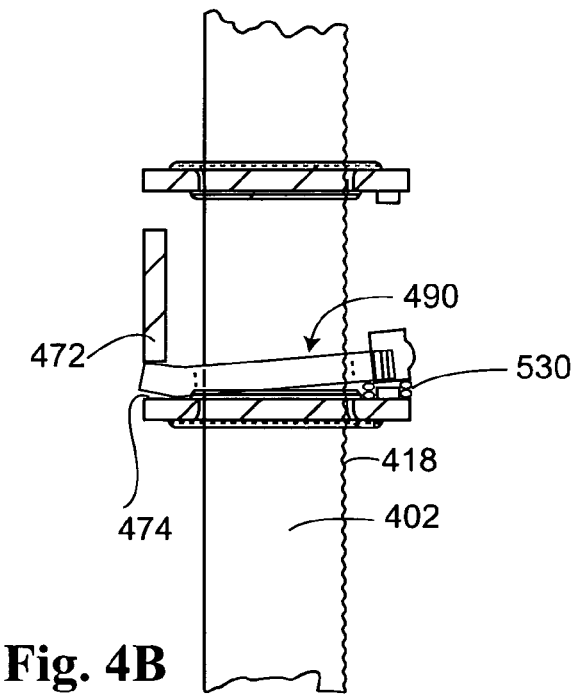
FIG. 4B shows a height adjuster in its unlocked condition.
Figure 4F:
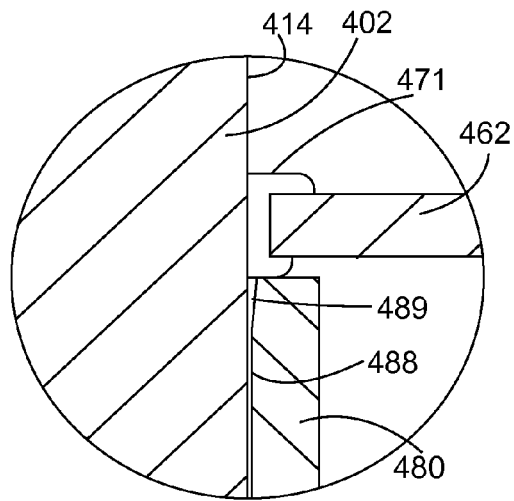
FIG. 4F is an enlargement of the right, upper corner of the friction coupling, also showing a bar.
Figure 4E:
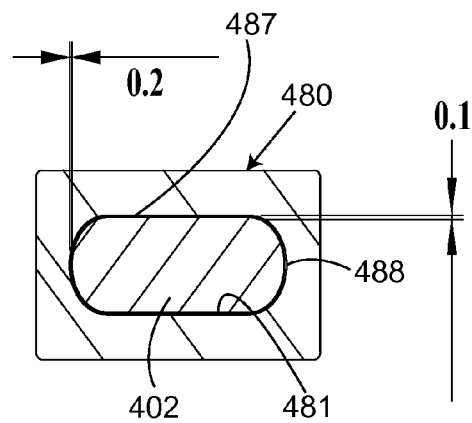
FIG. 4E shows a cross-sectional view of a friction coupling.

Reference is briefly made to FIGS. 4A and 4B, which respectively show a locking lever 490 in its locked position and in its rotated, free position. In the locked position, downward motion of the carrier 460 is prevented primarily due to the engagement between the locked corner 592 and a particular tooth 418 into which the corner 592 engages. When locking lever 490 is rotated downwardly ever so slightly, locking corners 592 and 594 disengage from the bar 402. This action permits the carrier 460 (and web guide and shoulder belt which are movable with the web guide) to be moved upwardly or downwardly to a new locked position, which will enable the shoulder belt to cross the occupant's body at a more comfortable orientation.

One of the benefits of the present invention attributable to having the plurality of contiguous locking features such as the teeth 418 extending across the operative zone of the height adjuster 400 is that the user, when moving the carrier 460 up and down, will be assured to locate the lock edge 592 in a tooth 418. This is not the case with some prior art height adjusters, which permit the corresponding locking mechanism to be repositioned between locking features. An advantage of utilizing the plurality of contiguous locking features 418 is that when an impulsive force is applied to the web guide 550 and hence to the carrier 460, the contiguous teeth 418 do not permit the carrier to be rapidly accelerated between locking features as happened in the prior art.

As can be seen in the various figures the base 492 of the locking lever is inserted within the lower (pivot) space 474. The thickness, t, (see FIG. 4) of the base 492 is smaller than the height h1 of the lower space 474 to enable easy assembly of locking lever 490 to the carrier 460 and allows space for base 492 to pivot.

As mentioned above the carrier assembly 450 includes the locking lever 490 and a spring 530. The carrier assembly 450 additionally includes the lever cap 600 (see for example FIGS. 1 and 2). The lever cap 600 is secured to (or molded to) the distal end 491 of the locking lever 490. As will be seen below the helical spring 530 is received upon the lever cap 600. The lever cap 600 is preferably formed as a plastic inserted molded part molded upon the locking lever 490. However, the lever cap 600 can be separately formed and attached to the locking lever 490. The lever cap 600 may include the recess 602 to receive the distal end 491 of the locking lever.

The lever cap 600 also includes one or more spring locating features 604, which cooperate with an end of spring 530 to position spring 530 properly relative to the locking lever 490 and to hold the spring to the lever. As illustrated, the lever cap 600 includes two such locating features 604 formed as posts, thereby enabling the lever cap 600 to be rotated 180 degrees relative to the locking lever and still be able to locate the spring 530. The spring locating features 604 can also be formed as a circular cylindrical recess.

The lever cap 600 includes a circular, cylindrical projection or pin 610. With the lever cap 600 on the locking lever 490 the pin 610 extends forwardly. As can be seen more clearly in FIG. 3C the pin 610 extends beyond the front surface of the front wall 466 of the carrier 460.

One of the characteristics of the above height adjuster 400 is when locked, it will not move downward unless the lock lever 490 is manually moved to disengage the lock edge 592 from the bar 402. The height adjuster is, however, upwardly movable even if the lock lever is not manually depressed. For example, the D-ring or web guide 550 can be manually grasped and pushed upwardly; this upward force will cause the lock lever 490 to move relative to side 414. Such movement might be smooth or the lock lever might start to bounce causing an audible sound even if side 414 is smooth. The height adjuster can be moved upwardly even if side 414 includes the locking features 416 such as the plurality of teeth 416. In this case, the lock lever will definitely bounce on the teeth causing a larger audible sound.

Figure 4D:
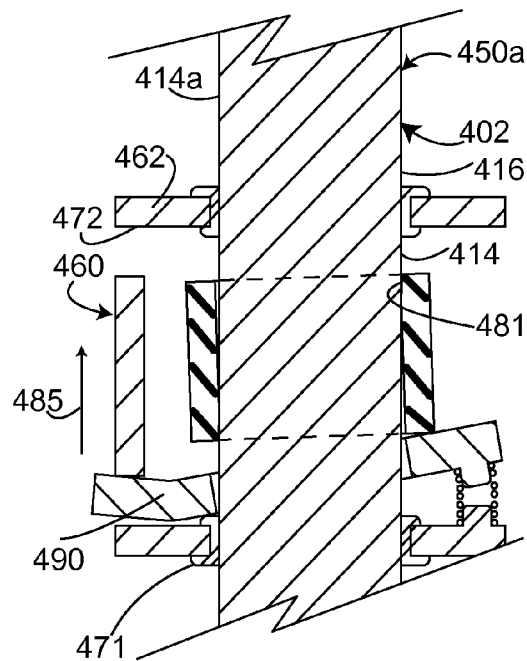
FIG. 4D shows the height adjuster of FIG. 4C in its unlocked condition.
Figure 4C:
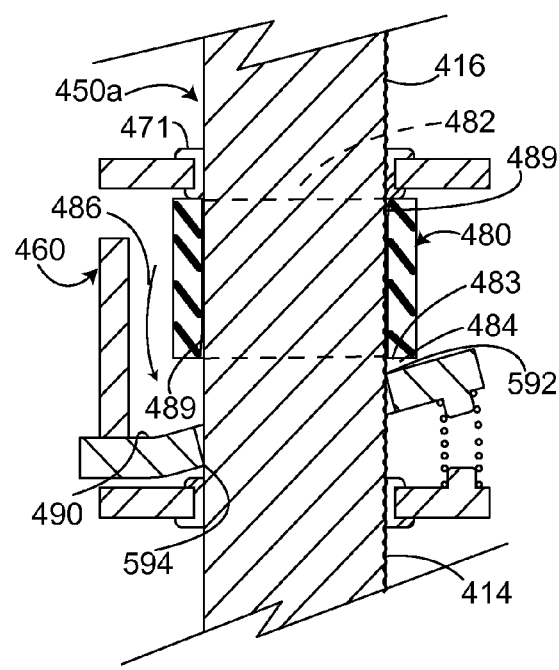
FIG. 4C shows an enlarged view of an alternate embodiment of a height adjuster in its locked position.

The following embodiment eliminates or at least significantly reduces such audible sound. Reference is made to FIG. 4C, which illustrates an alternate carrier assembly 450a. Carrier assembly 450a includes those elements shown in carrier assembly 450 and additionally includes a friction coupling 480. In the illustrated embodiment the friction coupling 480 is made from rubber or a rubber-like material, having hardness in the range of Shore A 35 to about Shore A 85. Materials such as polyurethene, nitrile, butyl latex, pure gum, styrene-butadiene, neoprene, epichlorohydrin, EPD, Santoprene, Hytrel, vinyl and viton rubbers can be used.

The friction coupling 480 includes an opening 481 that is generally conformal to the exterior shape of bar 402. As illustrated, opening 481 includes two parallel sides 487 and two curved ends 488, which closely resemble the shape of bar 402. As can be appreciated, the ends 488 of the opening can be straight, even if the bar is curved. The opening 481 is generally slightly larger than bar 402. While the inner walls of the friction coupling 480 are shown spaced from bar 402 on all sides at about the same distance, this is not a requirement of the invention. For example, the flat sides of opening 481 can be extremely closely spaced to the flat sides of the bar, while the end spacing between the bar and a corresponding end surface of opening 481 can be larger. For example, such spacing can be 0.1 mm between the flat sides of the bar and the flat sides of the opening 481, and 0.2 mm between the end surface of the bar and the end surface of the opening 481.

The length of the friction coupling 480 is such that when an upper surface 482 of the friction coupling is against the lower surface of top 462 or against the lower surface of bushing 471, as the case may be, and the lower surface 483 of the friction coupling 480 is slightly spaced, see space 484, from an upper surface of the locking lever 490.

When the locking lever 490 is manually depressed and the carrier assembly 450a is moved downwardly, the carrier 460 and the friction coupling 480 will achieve the orientation illustrated in FIG. 4C. In general, the undersurface of top 462 (of the carrier 460) and the top surface 468 (of the friction coupling) will butt against each other as the nominal level of friction generated between the friction coupling 480 and the bar 402 will relatively bias the friction coupling upwardly as the carrier 460 is moved downward. As mentioned above, with the carrier assembly 450a in its locked condition, D-ring 550 can be manually grasped and pushed upwardly to reposition the carrier assembly to a new, higher orientation on the bar 402. As can be seen from the various figures, the D-ring 550 is directly connected to the carrier assembly 450a. Any upward movement (see arrow 485) of the carrier assembly 450a relative to bar 402 will generate friction and cause the relative, downward displacement of the friction coupling 480 relative to the carrier 460 and bar 402 as illustrated in FIG. 4D.

This relative downward movement of the friction coupling 480 reduces the space 484 to zero and begins to push the locking lever 490 out of its locked condition. Simultaneously, the reaction force of the locking lever onto the friction coupling 480 slightly rotates the friction coupling in the direction of arrow 486. This movement of the friction coupling relative to bar 402 increases the frictional force between the friction coupling and the bar, which tends to, at least temporarily, more forcefully couple the friction coupling to the bar. Subsequently, further upward motion of the carrier 460, which occurs in the range of approximately less than or about 1 mm, forcefully urges the locking lever 490 to its unlocked position, against the bias of spring 530. In this condition, the locking edge 592, of the locking lever 490, is disassociated from side 414 as well as from the teeth 416, if used. Consequently, further upward motion of the carrier assembly 450a is accomplished without the physical interaction, skipping or ratcheting of the locking lever 490, i.e., the lock edge, relative to side 414. As can be appreciated, such movement is accomplished without the attendant noise or wear, or at least with the noise and wear substantially reduced in comparison to that generated in the earlier embodiment.

In one embodiment the sides 487 and ends 488 are parallel and intersect the top surface and the bottom surface of the friction coupling generally at 90°. When this friction coupling rotates, opposite inside corners of opening 481 will engage the corresponding ends or sides 414 and 414a of the bar 402. FIG. 4D shows an alternate embodiment of the invention in which the top right and bottom left (as viewed in the drawings) sides of opening 481 include a small chamfer 489 (about 1 to 3 degrees). When this friction coupling is rotated, a greater surface area provided by the chamfer 489 will engage the sides 414 and 414a of the bar. This last described embodiment is thought to better control the friction-generating capability of the friction coupling as it may wear.

Reference is again made to FIGS. 1 and 2. The height adjuster 400 additionally includes the activation lever 700. The activation lever includes an opening 710 that is closely sized to the outside diameter of the fastener 510 thereby permitting the activation lever 700 to rotate upon the outside surface of fastener 510. The actuation lever 700 may be formed as a flat plastic molded part. As can be seen in FIG. 6 the activation lever 700 is secured to the fastener 510 using an annular lock washer 712 or similar fastener.

Figure 7A:
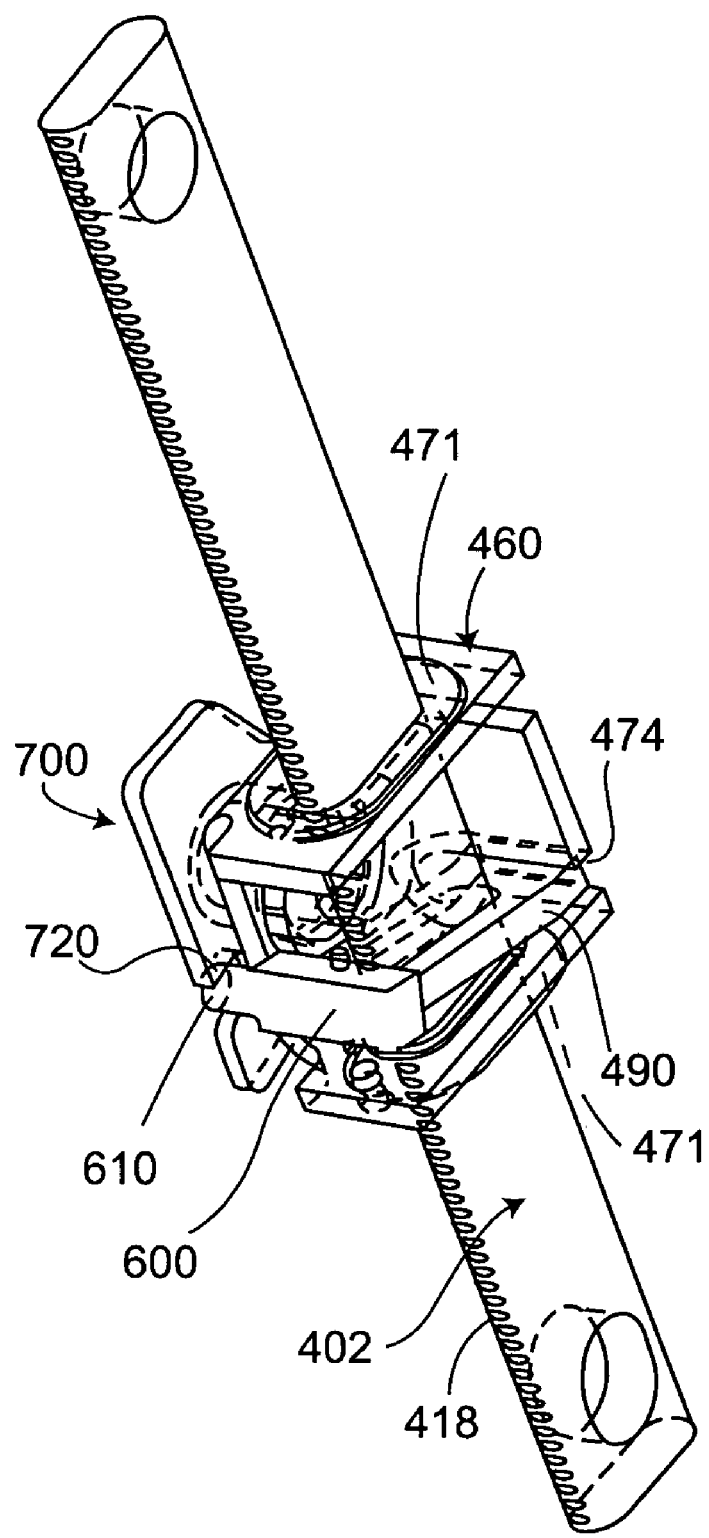
FIG. 7A is a rear isometric view of the height adjuster of FIG. 7.

The activation lever 700 additionally includes a receiving groove 720 having a height, $h_g$, which is slightly larger than the diameter of the cylindrical post or pin 610. As shown the groove 720 is radially extending. As can be seen in FIGS. 7 and 7A pin 610 is received within groove 720. The rotation of the actuation lever 700 (see arrow 713 in FIG. 7) moves the groove 720 downwardly, which forces pin 610 and locking lever 490 down. As mentioned above, this action also compresses the bias spring 530. When the activation lever is released the bias spring 530 returns the lever 700 to its non-activated position, again locking the carrier to the bar. The downward movement, i.e. the rotation of locking lever 490, reorients the opening 590 so that the walls of the locking lever opening 590 move away from the sides 414 and 414a of the bar 402. In this position the corner or lock edge 592 has been moved away from the teeth 418 and corner 594 has also been moved from side 414a of bar 402. This position corresponds to the free or unlocked position of the height adjuster 400.

With locking lever 490 in this orientation the carrier 460 can be moved upwardly and downwardly upon the bar 402 to a new location which presumably will provide a more comfortable experience for the wearer of the seat belt.

As mentioned above the thickness of the base 492 is smaller than the height h1 of the space 474. Consequently when the lever 700 moves downwardly against the bias force of spring 530 the locking lever appears to rotate about bend 496 but also slides laterally relative to side 472 further into opening 474; this movement is diagrammatically shown by arrow 430 in FIG 3B. As the thickness t, of base 492 approaches the size of the opening 474 movement of locking lever approaches a more rocking or rotational motion as the tendency to slide is reduced.

Figure 8:
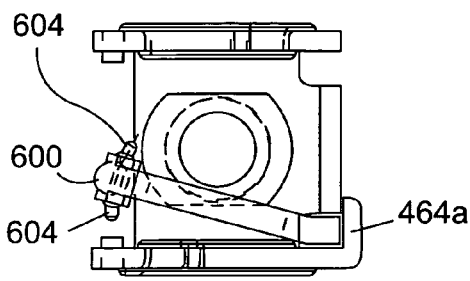
FIG. 8 shows an alternate embodiment of the invention.

Reference is briefly made to FIG. 8. As can be seen FIG. 8 is substantially identical to FIG. 3B with the exception that the carrier bottom 464 includes an upward extension 464a, which acts as a wall or stop. This wall or stop prevents the above-mentioned lateral motion of locking lever 490 through the opening 474. In this configuration the motion of locking lever 490 is generally completely rotational motion and less effort is needed to move the lever, preventing excessive wear to edge 592 of the locking lever 490.

Figure 9:
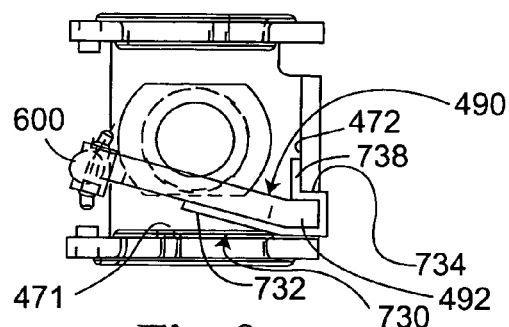
FIGS. 9, 9A and 9B show other embodiments of the invention.
Figure 9A:
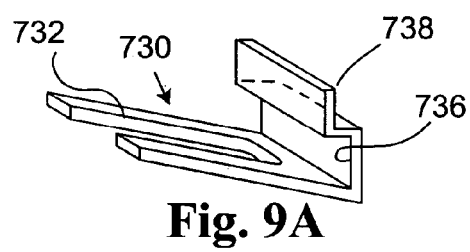

Reference is briefly made to FIG. 9, which shows an alternate embodiment of the present invention. In this embodiment the helical spring 530 has been replaced with a leaf spring generally shown by numeral 730. The leaf spring 730 includes one or more spring metal leaves located below the locking lever to bias same clockwise in FIG. 9. In FIG. 9 a single pre-formed leaf 732 is positioned above the lower bushings 471, if used (or atop the upper surface of the carrier bottom 464) and under the surface of the locking lever 490. The leaf 732 includes an opening for receipt of the bar 402 or the leaf may be bifurcated into two spaced legs and the bar 402 positioned therebetween. The leaf provides for a balanced biased force across the lower surface of the locking lever 490. The imposition of the leaf 732 biases the base 492 of locking lever 490 upwardly generally toward a lower surface 734 of side 472. This upward bias acts to limit the lateral motion of the locking lever 490 assisting to generate friction forces, which oppose the lateral motion as the lever is depressed.

Figure 9B:
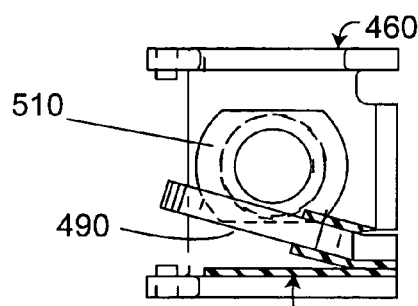

Additionally, the leaf spring 730, which is formed of spring steel, may include pocket portion 736, which is received within the lower space 474. The spring 730 may also include an extending flange or wall 738 which, as can be seen in FIG. 9, is located adjacent an inner surface of side 472. The base of the locking lever is received in this pocket portion 736. This configuration of the spring 730 with the flange also prevents the lateral movement of the locking lever as it is depressed. FIG. 9B shows the leaf spring 730a is molded about the locking lever.

Figures 10, 11:
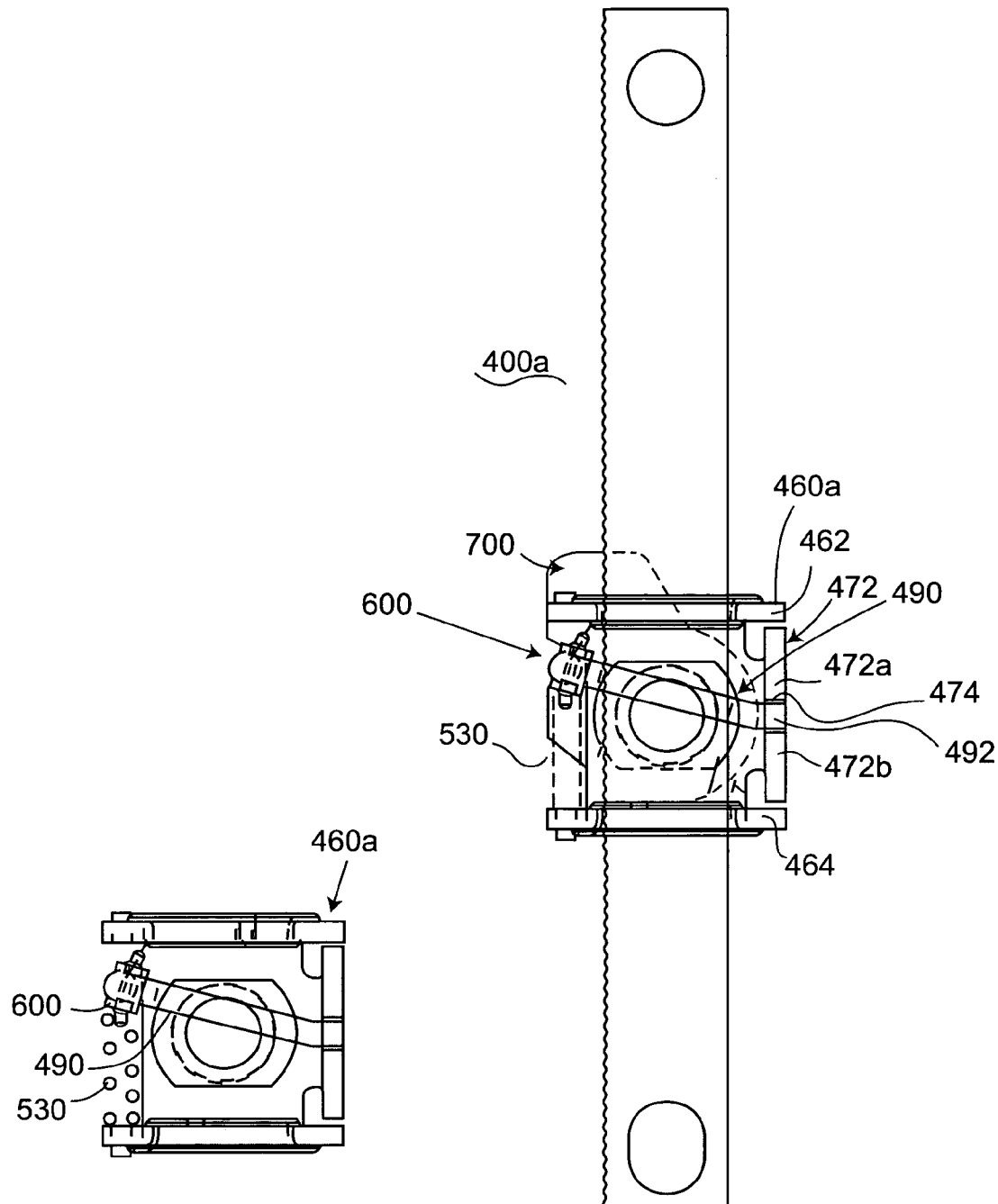
FIG. 10 is a rear view of another embodiment of the invention.
FIG. 11 shows further details of a carrier and locking lever used in FIG. 10.

FIGS. 10 and 11 show details of an alternate embodiment of the present invention. More particularly, there is illustrated a height adjuster 400a, which includes most other parts illustrated in FIGS. 1 and 2. One of the major differences between height adjuster 400a and height adjuster 400 is the placement of the locking lever 490 relative to a carrier 460a. As can be seen in both FIGS. 10 and 11, the carrier 460a includes a modified side 472, which includes upper and lower portions 472a and 472b separated by a space 474. As in earlier embodiments, base 492 of the locking lever 490 is received in space 474. However, in this embodiment the space 474 is generally in the center of side 472 as opposed to being oriented adjacent to the bottom 464 of the carrier. In this embodiment the bend angle between the locking lever base 492 and the actuating portion 494 can be the same angle as used in the earlier embodiments, that is, approximately 15 degrees. Additionally, since the distal end 491 and lever cap 600 are located a greater distance away from the bottom 464 than in earlier embodiments, a larger spring 530 interconnects the lever cap 600 and the bottom 464 of carrier 460a. The height adjuster 400a additionally includes the activation lever 700 with the groove 720. The relative position of groove 720 upon the activation lever 700 has been changed to accommodate the new location of the lever cap 600 and its associated pin 610.

Reference is again made to FIG. 6, which shows another feature of the present invention. Numeral 402a shows an alternate bar, which is curved. As illustrated bar 402a is convex in shape and more particularly bar 402a lies about a circle having a radius of about 7.5 inches. The carrier 460 is able to traverse curved bars, which is not the case with the prior art. The size of the openings in the top and bottom of the carrier, 460 as well as the size of the openings in the bushings may have to be increased to accommodate the curved bar.

Figure 12:
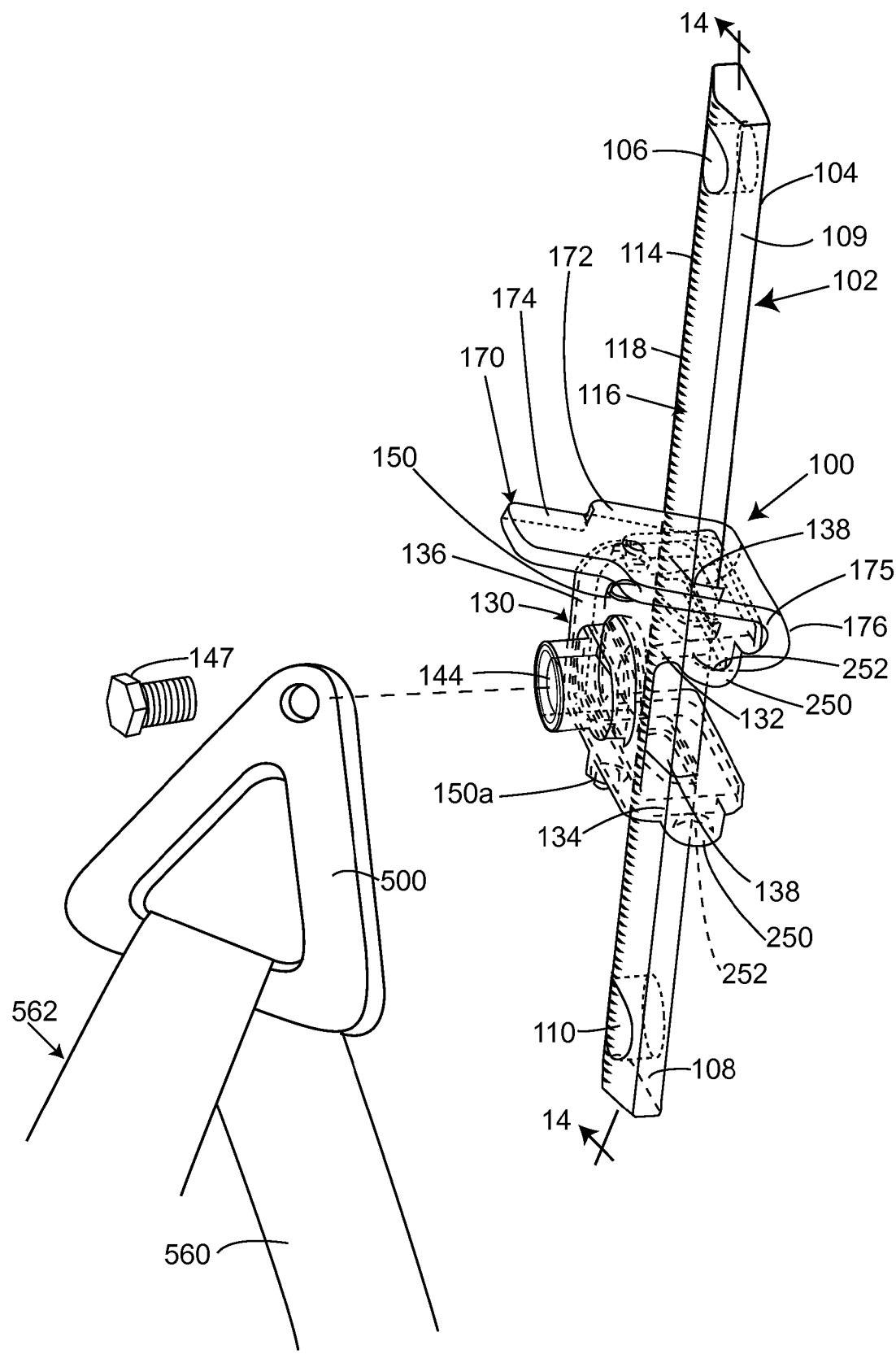
FIG. 12 is an isometric view of another embodiment of the invention.
Figure 12A:
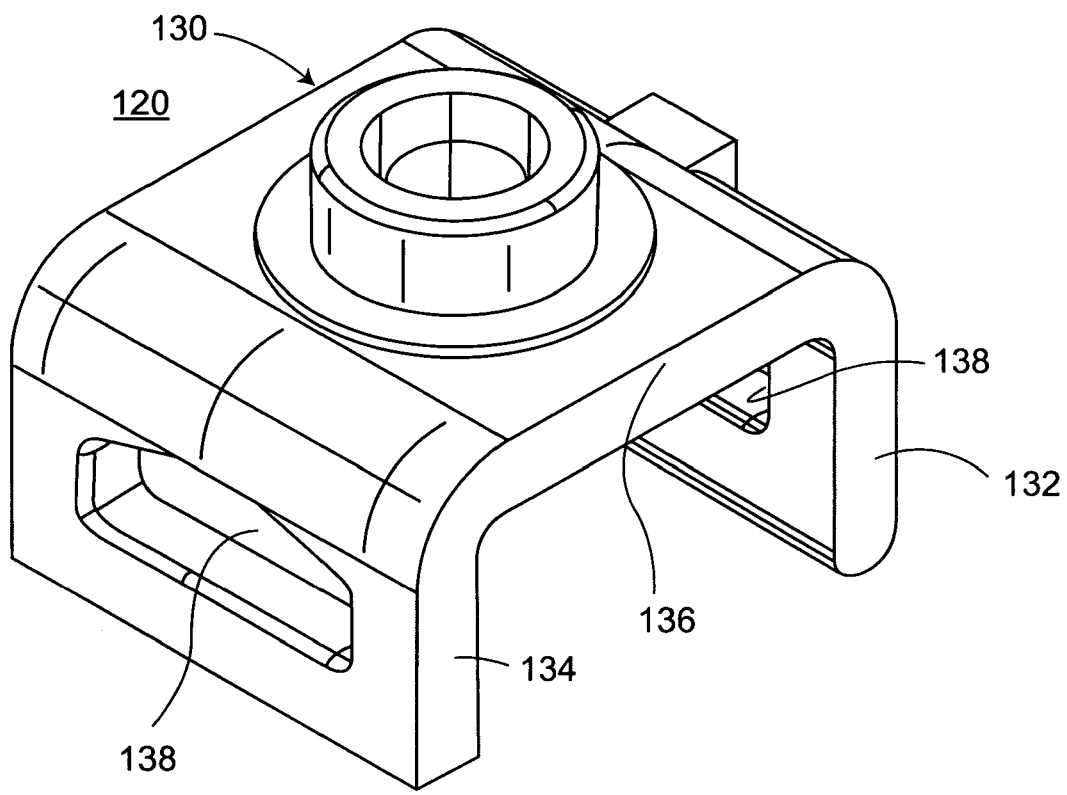
FIG. 12a is an isometric view of the carrier in FIG. 12.
Figure 13:
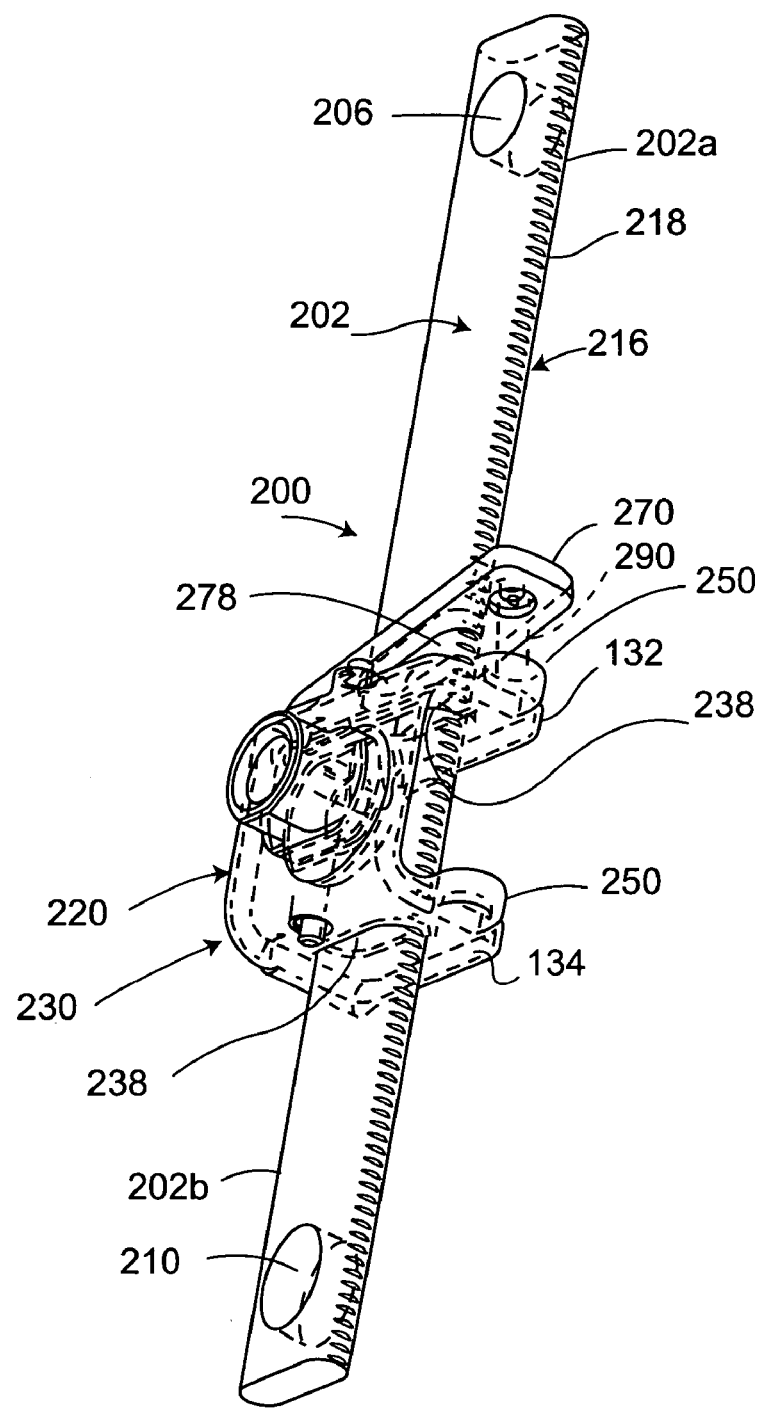
FIG. 13 is an isometric view of another embodiment of the invention.
Figure 14:
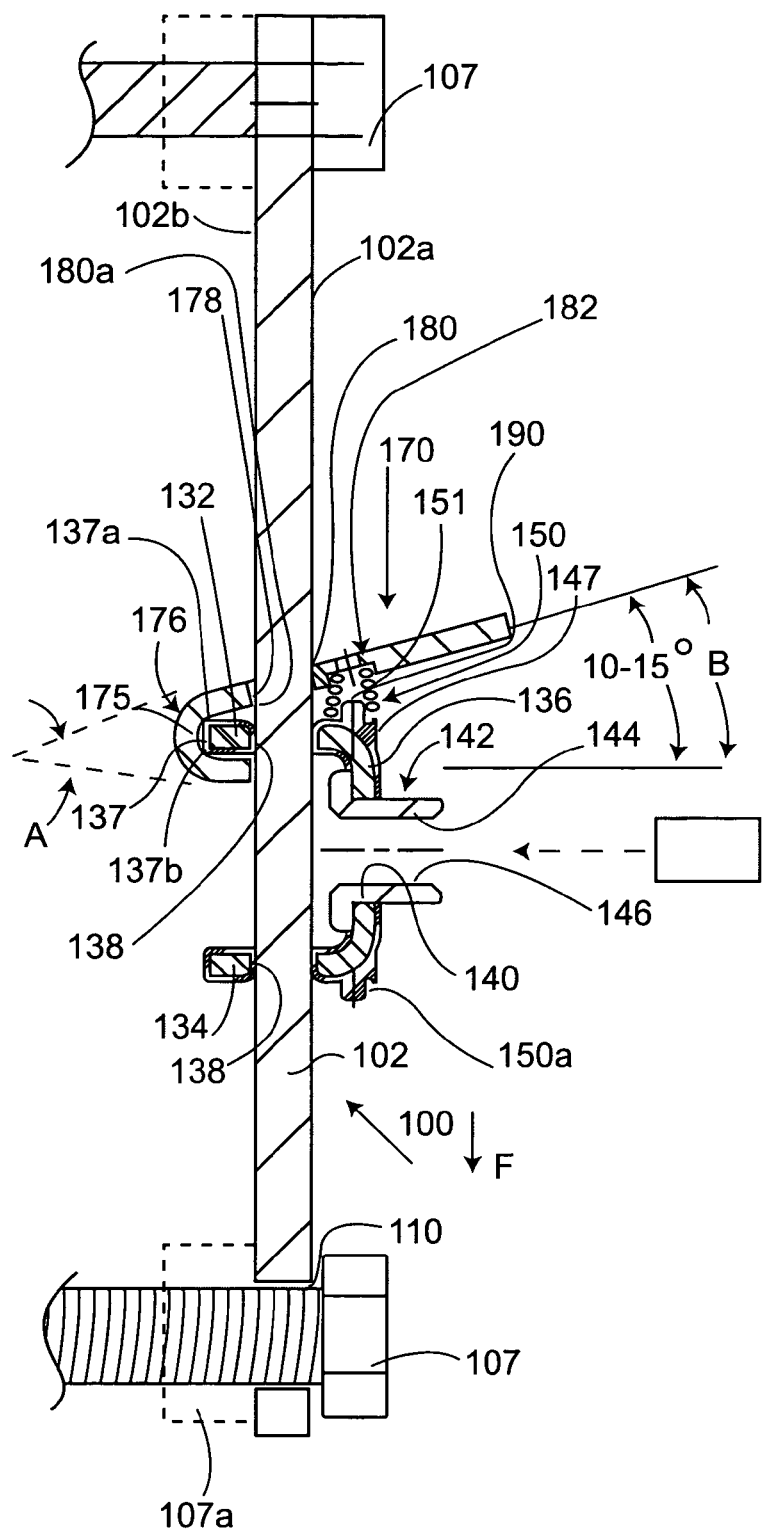
FIG. 14 is a cross-sectional view taken through section 14—14 of FIG. 12.
Figure 15:
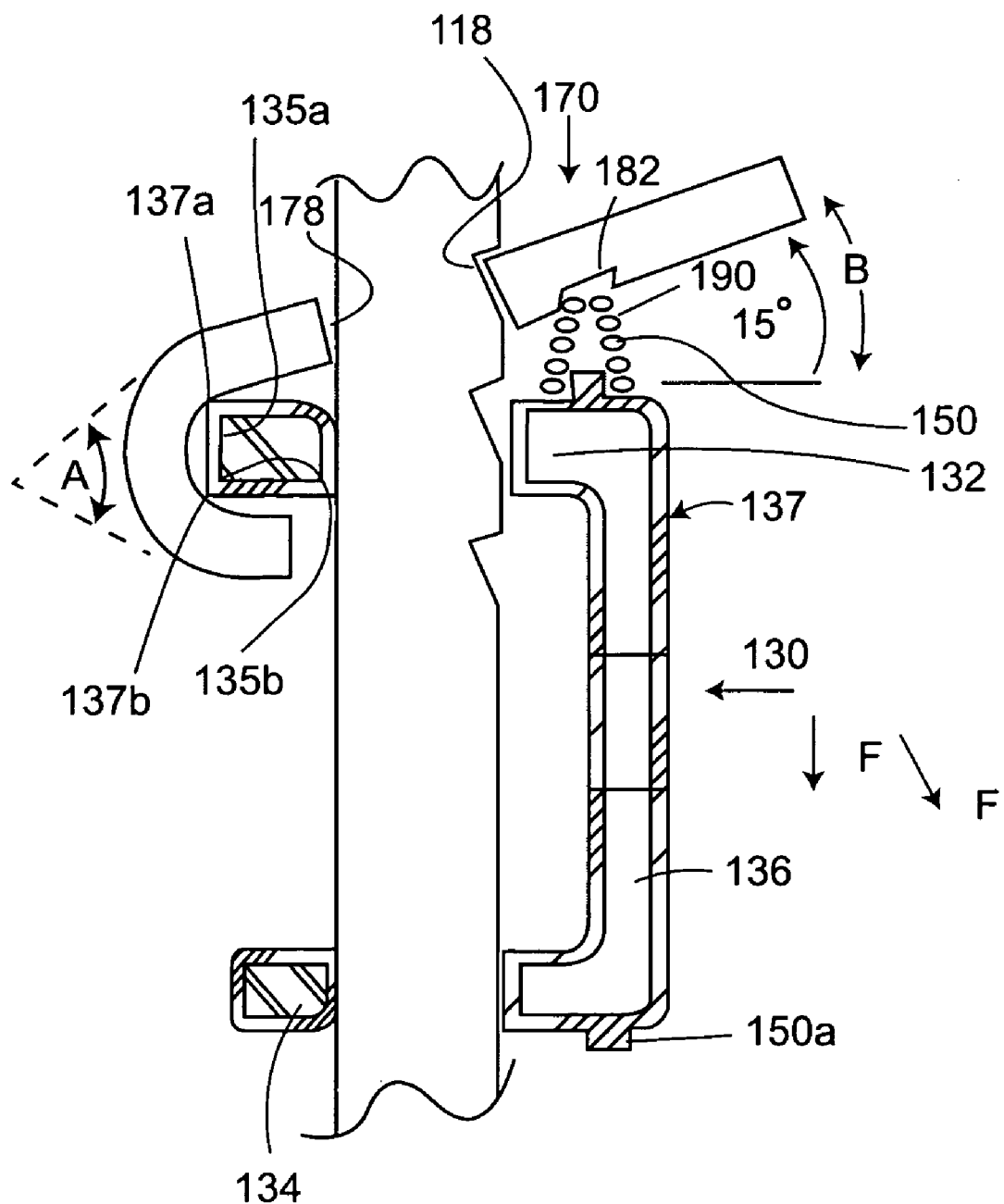
FIG. 15 is an isolated view of the carrier.

FIGS. 12 and 13 show alternate embodiments of a height adjuster incorporating the present invention. The height adjuster 100 of FIG. 12 includes a mounting bar 102 and a carrier 120 (shown in greater detail in FIG. 12a). The carrier 120 includes a carrier body 130, locking lever 170 and a bias spring 190 (see FIG. 14). In the preferred embodiment the bar is a heat-treated steel. The mounting bar is adapted to be mounted to a support surface or structure such as to a portion of a vehicle or to a vehicle seat. By way of illustration, end 104 of bar 102 includes a mounting opening 106 and end 108 includes a mounting opening 110. A respective bolt 107 (see FIG. 14) is received within openings 106 and 110 and a spacer 107a can be used to easily space the rear of the height adjuster 100 from an adjacent mounting surface. The mounting bar 102 includes at least one engagement or locking surface, which can be its front, sides or rear. In this embodiment a first locking surface is formed by the front side or surface 114. The front side may include an optional set of locking features 116 such as a plurality of vertically spaced teeth, grooves or indentations 118. Satisfactory test results have been obtained without the use of the locking features 116. FIGS. 14 and 15 show these indentations or grooves 118 in more detail. As can be seen, the bar 102 of FIG. 12 has a generally triangular (including a truncated triangular) cross-section, which is not a limitation of the present invention. The use of the triangular cross-section provides increased tensile strength at a reasonable cost.

Reference is briefly made to FIG. 13, which illustrates an alternate height adjuster 200. In this embodiment, a locking lever 270 is arranged to pivot about a side surface of its carrier 220 and extends outwardly toward an opposite side of the carrier. This height adjuster 200 includes a mounting bar 202 and the carrier 220, which is substantially identical to carrier 120. The mounting bar includes mounting openings 206 and 210. The carrier 220 includes a carrier body 230, locking lever 270 and spring 290. The cross-sectional shape of the mounting bar 202 is oblong and more specifically oval. Additionally, the mounting bar 202 includes a plurality of locking features 216, such as grooves, slots, or indentations 218 located on one or the other sides 202a or 202b of bar 202.

Returning to FIG. 12, the carrier 120 is adapted to be moved along the mounting bar 102 and has a generally U-shaped cross-section having a top wall (top) 132 and a bottom wall (bottom) 134 and a center wall (center) 136. Each of the top and bottom walls 132 and 134 respectively includes an opening 138. The opening 138 closely conforms to the cross-sectional shape of the bar 102.

As can be seen in FIG. 12, each of the openings 138 comports with the cross-sectional shape of the mounting bar. In this embodiment the opening is triangular in shape. The comparable openings 238 of the carrier of FIG. 13 are oval/oblong in shape. FIG. 14 shows the center wall 136 which includes another mounting opening 140. A nut 142 is received within opening 140 and fastened to the center wall 136 such as by being swaged, or welded or by another acceptable process. The nut 142 includes a center bore 144 having threads 146. A D-ring fastener 147 is threadably received within bore 144 to hold a D-ring (web guide) 500 in place.

Figure 15A:
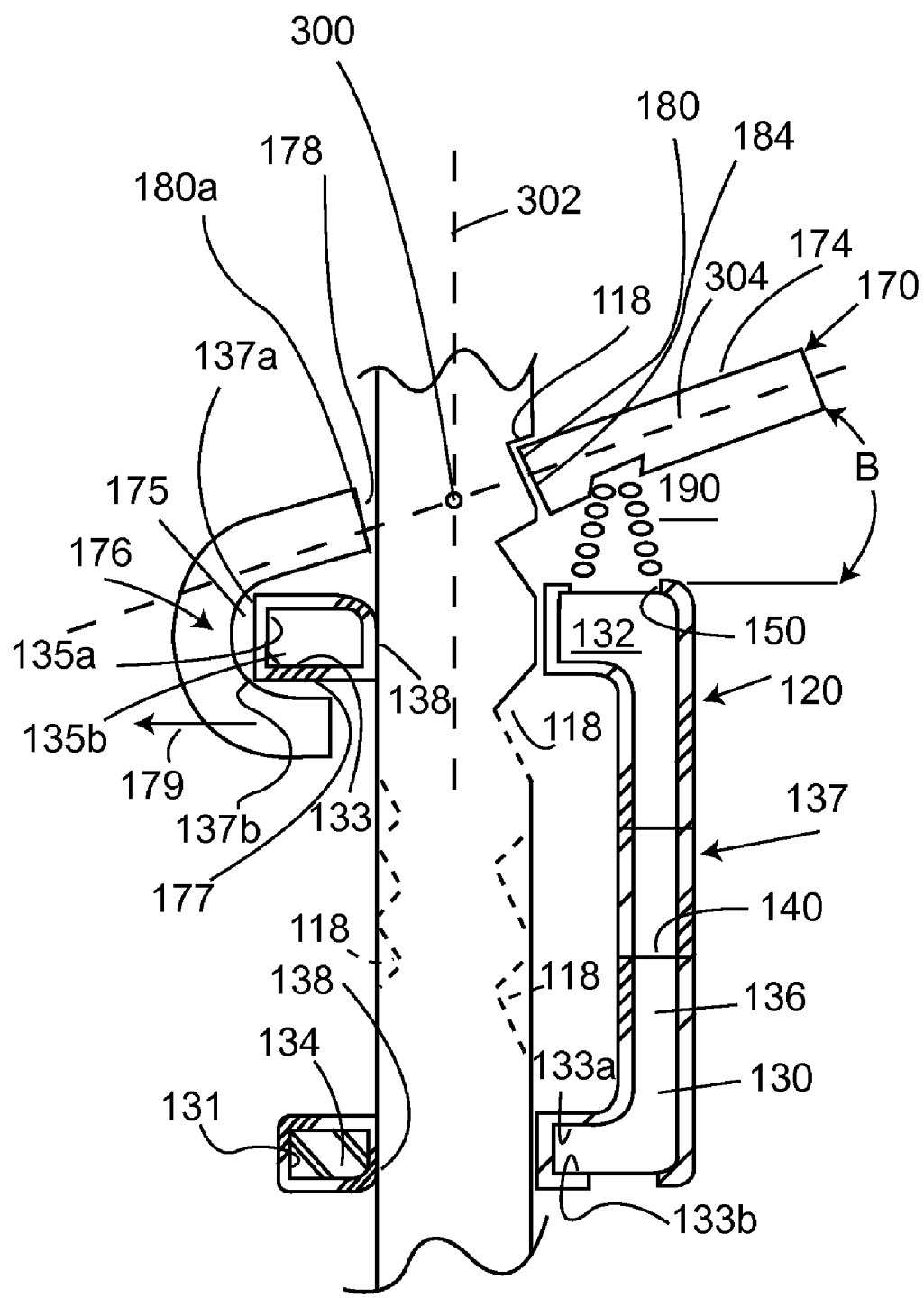
FIG. 15a shows an alternate carrier.

Reference is made to FIGS. 15 and 15a, which show more details of a carrier such as 120. The carrier 120 includes a carrier body 130, a locking lever 170 and a spring 190. The carrier body, for example, can be made from a metal stamping and consequently the sides or edges 131 of the carrier body are generally perpendicular to the faces 133a, b of the carrier body 130 forming relatively sharp corners 135a and 135b (as shown in FIG. 15a). The carrier, as in all of the earlier embodiments can be made of steel, which may or may not be heat treated depending on the performance specifications and can optionally be covered by a plastic covering material 137 such as nylon to reduce sliding and static friction. Since the coating thickness can be applied relatively thin (or with contours), the coating material will follow the form of the carrier and provide relatively sharp corners 137a, b.

The carrier additionally includes a spring retaining or fastening feature 150 in the form of a projection. In FIG. 14 this feature is formed by a small projection or pin 151 that is formed as an integral part of the plastic covering material 137, which can be over-molded about a steel body of the carrier 120. Alternately this retaining feature 150 can be formed as a small recess (as shown in FIG. 15a). The carrier 120 can also include a second spring retaining feature 150a (that is formed by the plastic covering material) and is located on the bottom wall of the carrier 130. Having this second feature provides a degree of symmetry to the carrier enabling it to be used in a right-handed or left-handed installation, thereby reducing needed parts-count and reducing overall cost. Additionally, with a few changes the same carrier can be used for the embodiment of FIG. 13, further reducing the amount of parts and the tools needed to make the height adjuster.

The lever 170 (which is typically heat-treated steel) includes a base 172 and an actuating arm 174. Additionally, the lever 170 includes a curved socket 176. The inner or engagement surface 175 of the curved socket is shown. The curved socket 176 is movably received about a mating portion of the top 132 such as about the corners 137a,b and more specifically received about a rear portion of covering material 137, which forms the corners 137a,b. The base 172 includes a sharp cornered opening 178, which is similar in shape to the cross-sectional shape of the mounting bar 102 but is slightly larger to permit an unimpeded sliding motion between the carrier and the bar.

Reference is made to FIGS. 14, 15 and 15a, which illustrate the lever in a locked mode of operation. As can be seen, a perpendicularly shaped corner or edge 180 of the locking lever proximate the opening 178 engages the front 102a of the mounting bar 102. If, however, the bar 102 includes the locking formations 116 such as the grooves 118, the edge 180 is received within one of the grooves 118 in an alternate state of locking engagement. In another embodiment the grooves can be placed on both opposing sides of the bar. The included angle of the teeth (grooves, indentations) 118 is about 90°. In this position, the lever 170 has moved about the coated end corners 137a and 137b of the top wall 132 and is maintained in this locking orientation by the bias force provided by spring 190. As can be seen in FIGS. 14 and 15, the lower end of the (helical) spring 190 is seated about the retaining feature 150 and the upper end of the spring is located within another spring retaining member 182, which is in the form of a small circular recess. This retaining member could alternatively be formed as a stamped projection (not shown) of the metal core material of the carrier.

Depending upon the relative clearances between the carrier 120, the locking lever 170 and the mounting bar 102, the locking lever 170 can also lockingly engage the rear surface 102b of the bar. This additional locking is more apparent in FIG. 15a. For example, the lower edge 180a about opening 178 can become pressed into the rear of the mounting bar, or surface 102b could include additional locking formations similar to 116 such as grooves 118.

In the position as illustrated in FIG. 14 or 15, if a downward force, see arrow F, or at least a component of downward force, is input via the shoulder belt to the web guide to the carrier 120, the carrier does not move downwardly because of the locking interaction between the edge 180 (and perhaps edge 180a) and the front wall of the bar. With an increase in the force F, the locking lever 170 displays a self-energizing action and the locking edge 180 will be pressed with greater force into the mating face of the mounting bar.

Figure 16:
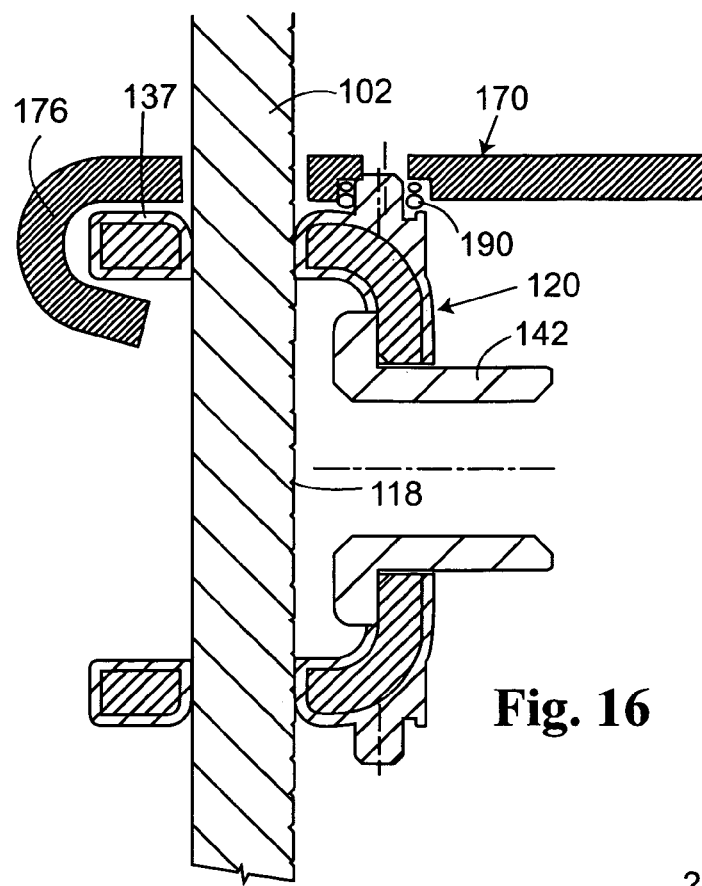
FIG. 16 is a cross-sectional view showing the lever in a non-locking position.

If it is desired to relocate the carrier 120 (including the D-ring) vertically on the mounting bar 102, the occupant will grasp the bottom wall 134 (or the lower surface of the nut 142 or the D-ring) with his or her thumb while placing another finger on the top surface of the activation arm 174 and urge the locking lever 170 into the position shown in FIG. 16 in which the walls 184 of opening 178 are now parallel to the walls 102a, 102b of the mounting bar. (The locking edges are clear of the mounting bar.) In this position, the carrier 120 can be moved upwardly or downwardly to a new desired position. When the carrier (D-ring and shoulder belt) have been relocated the occupant releases the locking lever 170 and the locking lever 170 will return to its locking orientation with the mounting bar 102.

In the embodiment of FIGS. 14, 15, and 15a the curved socket 176 of the locking lever 170 closely envelops the corners 137a, b of the covering material 137. With this construction this end of the lever may tend to pivot about the corners. However, in general, the motion of the locking lever as it moves to and from its locked and free positions is rather complex and depends on many factors such as the relative spacing between the opening 178 in the locking lever and the cross-section of the mounting bar, the included angle A of the curved socket 176 and the height of the carrier top (from corner 137a to corner 137b), the angle at which the spring 190 is mounted to the lever and to the carrier, the spacing between the undersurface 175 and the corners 137a,b, the shape and texture of the lower surface 133 of the top (which acts as an engagement, contact, support or blocking surface), the departure angle B of the arm 174 (which is nominally 10–15°), etc.

In the locked position the spring 190 pushes the lever 170 upwardly so that a portion of surface 177 contacts corner 137b. The spring also urges the locking edge 180 into one of the indentations (teeth, grooves, etc.) 118 or at least against side 102a. When the arm 174 is pushed down, the lever 170 seems to pivot about an axis 300, which is perpendicular to the intersection of the bar centerline 302 and the axis 304 of the arm 174. As the arm 174 moves toward the top of the carrier, the curved socket 176 slides radially outwardly as indicated by arrow 179 but remains in contact with surface 133. The intersection point of the axes 302 and 304 will move as the lever is depressed. When the lever has been moved sufficiently, the locking edges 180 and 180a will be moved away from the bar 102 to enable the carrier to be moved to a new location.

Reference is again made to the carrier 120 shown in FIG. 12. Both the top 132 and bottom 134 of the carrier include extending projections 250, neither of which was used in conjunction with the initial embodiment of the invention. However, if one goal is to reduce parts count and to use a carrier that can be used in the embodiments of FIGS. 12 and 13, it would be helpful to fabricate within the carrier these projections 250. These projections most probably would be made using material 137 using a molded in feature. Additionally, each of these projections includes a spring retaining feature such as a cup-like recess 252. As will be seen below, the recesses 252 receive an end of a bias spring 290.

Figure 17A:
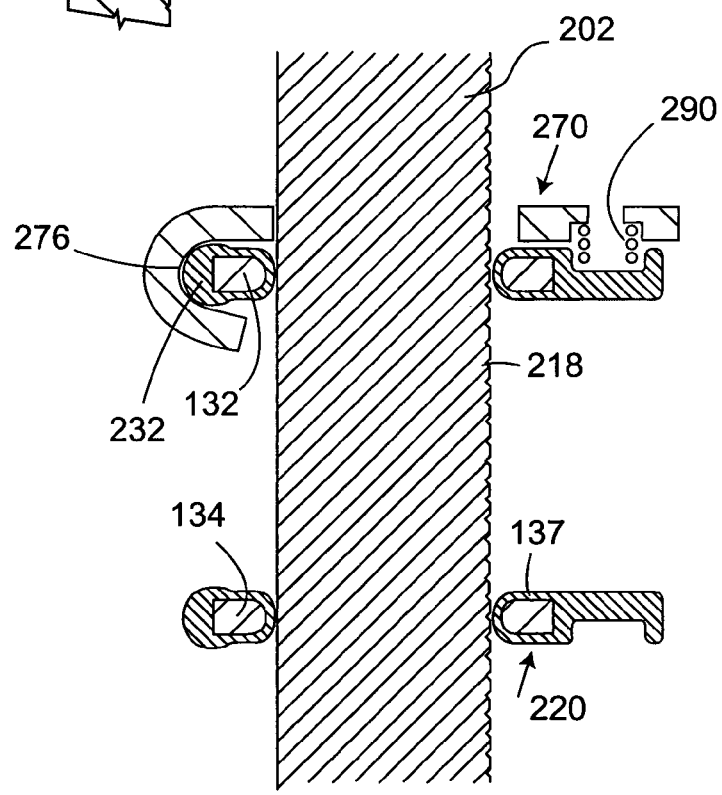
FIG. 17a shows the device of FIG. 13 in a free position.
Figure 17:
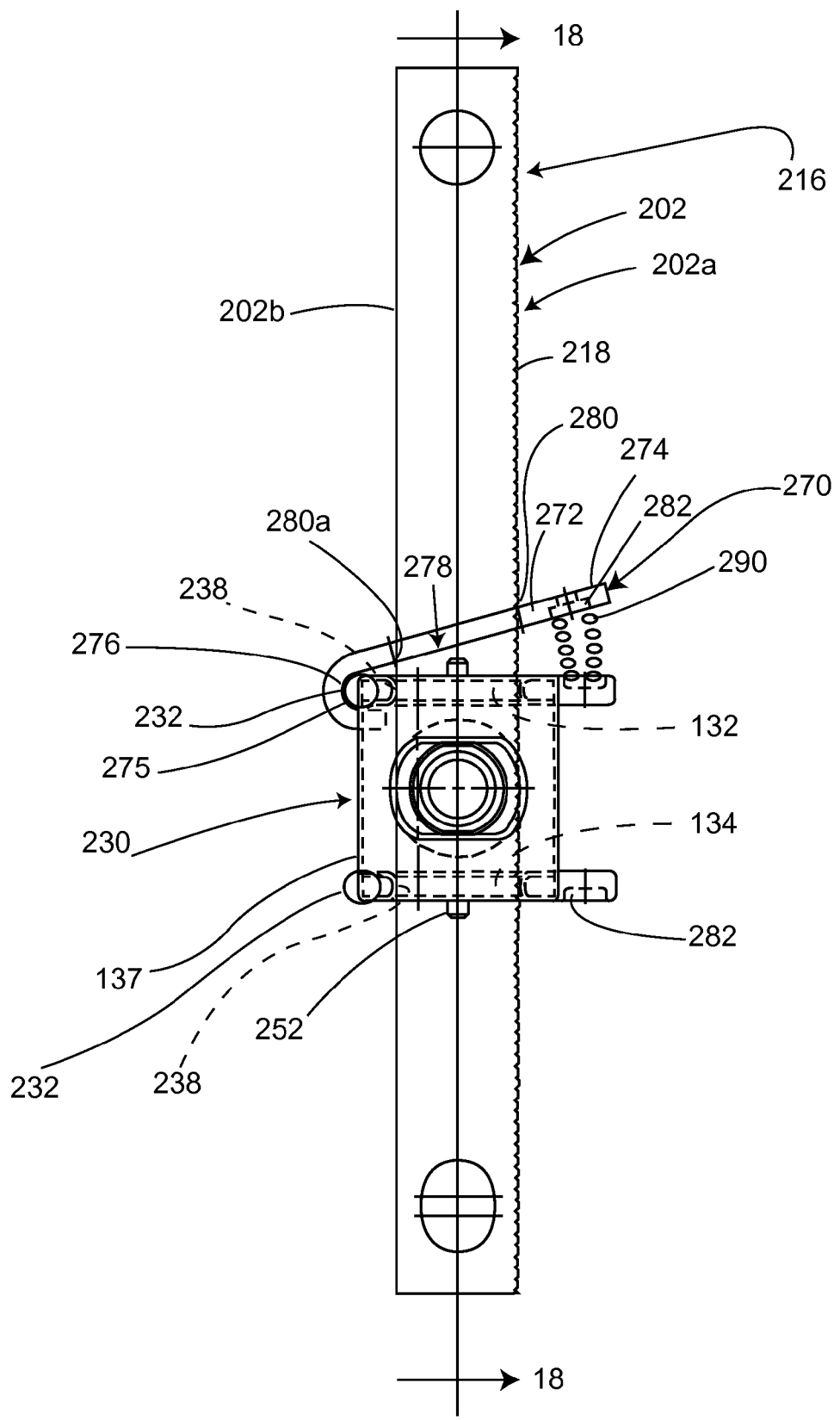
FIG. 17 is a front plan view of a height adjuster.
Figure 18:
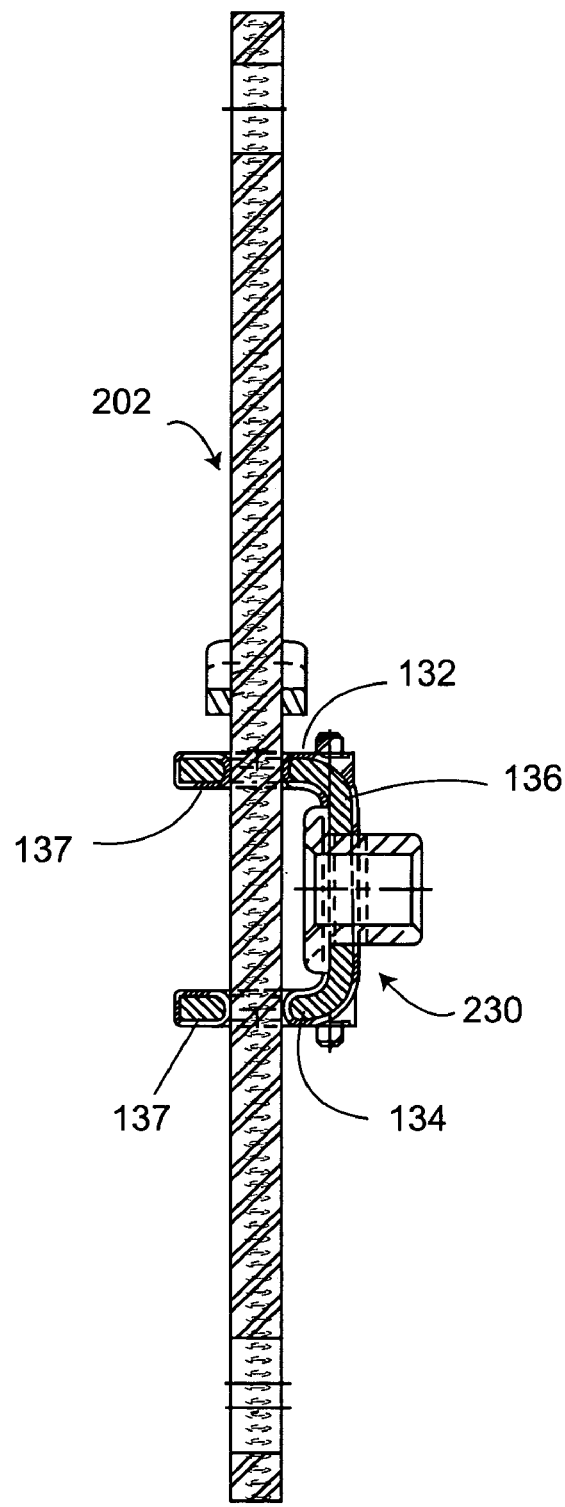
FIG. 18 is a cross-sectional view taken through section line 18—18 of FIG. 17.

Reference is again made to FIG. 13 as well as to FIGS. 17 and 18. The carrier 220 includes the body 130, which can be identical or substantially identical with carrier 120. One exception would depend upon the shape of the mounting bar 202. In this configuration, the mounting bar is oblong and as such the openings 238 in the top 132 and bottom 134 of carrier 220 are similarly oblong in shape. The bar 202 includes a plurality of locking features 216 such as the plurality of vertically spaced indentations 218, which are analogous to elements 116 and 118 of the earlier embodiment.

The locking bar such as 102 can be used in this second embodiment, however, the locking features 216 would be formed on the side 109 (see FIG. 12) of the locking bar.

By virtue of using the oblong bar 202 the openings 238 in the top 132 and bottom 134 of the carrier 220 are oblong though slightly larger. As can be seen in FIG. 17, the locking lever 270 is connected about a remote side 232 of the coated top 132 of the carrier 220. As before, the carrier body 230 is covered with a lubricious material 137. This plastic material 137 can be formed into the sharply shaped corners used in the above embodiment. However, in this embodiment the coating material at the remote side 232 is formed as a radial projection, which contacts the undersurface 275 of the curved end 276 of the locking lever 270.

The locking lever 270 also includes a base or center portion 272, an actuating arm 274 and the curved end or socket 276 opposite the actuating arm 274. The inner or engagement surface 275 of the curved socket 276 is movably received about the radially curved portion of the remote side 232. The actuating arm 274 includes a spring retaining feature such as a recess 282, which receives the other end of spring 290. As can be appreciated, the recesses or projections can be used as spring holding members. The actuating lever 270 additionally includes an opening 278, which is similar in shape to the cross-sectional shape of the mounting bar but slightly larger in the non-locking direction to facilitate unimpeded sliding motion between the carrier 220 and the bar 202 in the free position. In the locking direction, the shape of lever 270 has enough clearance to allow the prescribed lock angle to be achieved. As can be seen from FIG. 17, a top corner edge 280 of the locking lever 270 lockingly engages side 202a of bar 202. If the bar 202 includes the locking formations, this edge or corner 280 of the locking lever 270 will find a stable lock point within one of the indentations 218. The end 276 can be closely spaced to the carrier as shown in FIG. 17 or spaced to provide a greater clearance similar to that shown in FIG. 16.

Figure 19A:
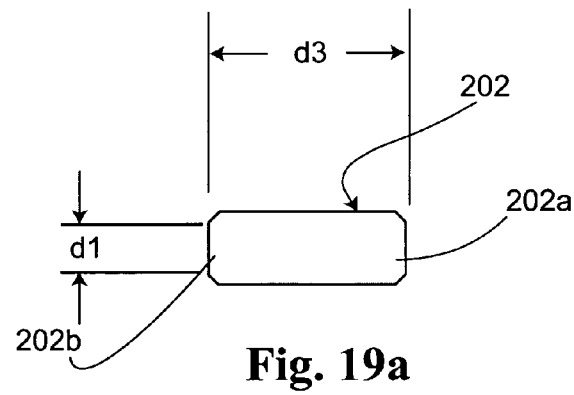
FIGS. 19a, 19b and 19c show alternates of the invention.
Figure 19C:
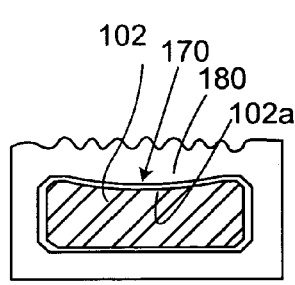
Figure 19B:
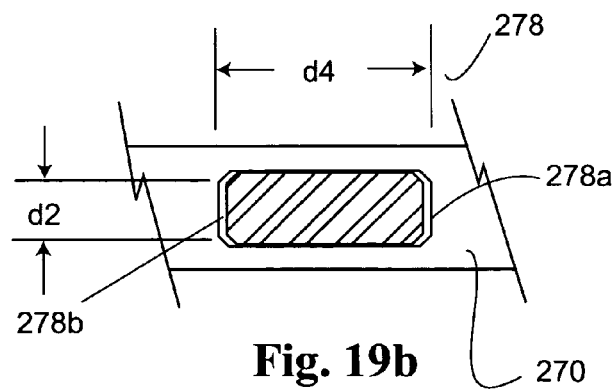
Figure 21:
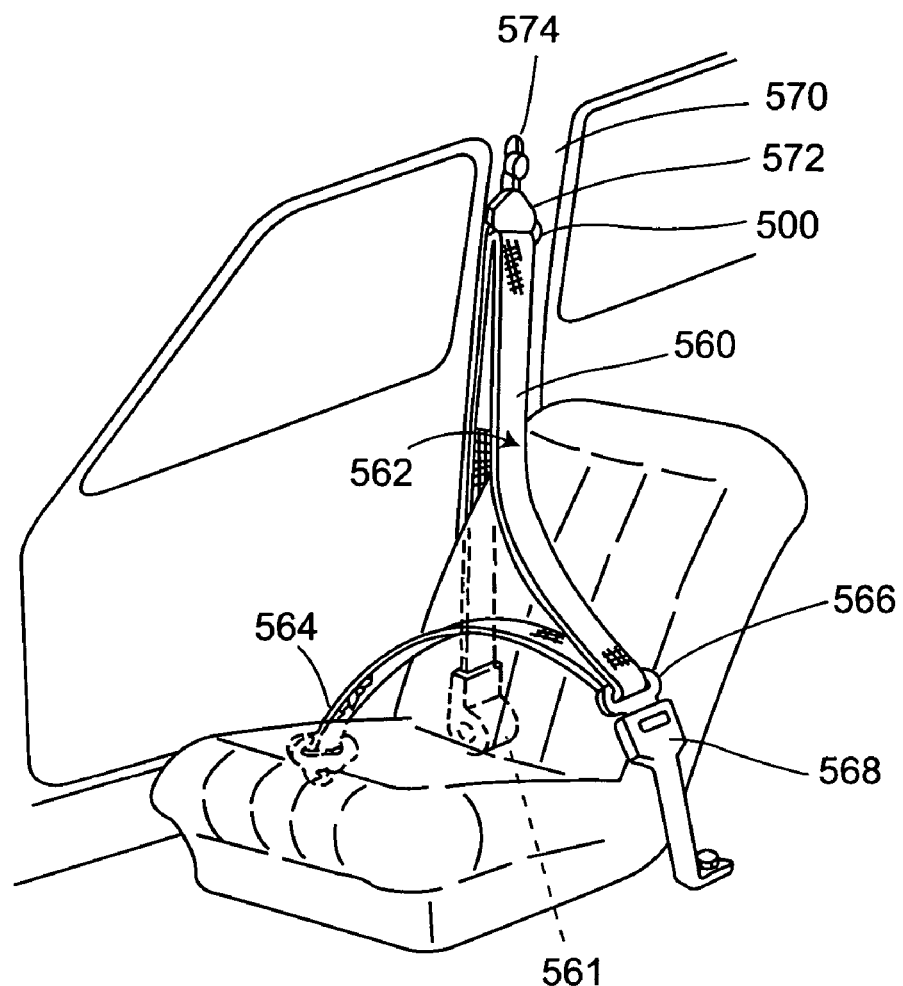
FIG. 21 shows a three-point seat belt system and a prior art height adjuster for a web guide (or D-ring).

Reference is briefly made to FIGS. 19a and 19b, which show alternate shapes for the mounting bar 202 and the opening 278 in the locking lever 270. In this embodiment the sides 202a and 202b of the bar 202 are flat. Correspondingly, the sides 278a,b of the opening are also flat. It was found that this configuration assists in providing a firm lock. The flat surface sides 202a,b are shown having a dimension d1 while the corresponding locking sides 278a,b (also lock edges 280 and 280a) of opening 278 have a dimension d2. It is believed a more positive lock will occur with d2 greater than d1. And in addition, d4 should be greater than d3 to the extent that ensures lock angle can be achieved. FIG. 19c shows another mounting bar 102 with a concave engagement side 102a engaged by a convexly bowed locking edge 180 of locking lever 170.

Depending upon the relative clearances between the carrier 220 and the locking lever 270 and the mounting bar 202, the locking lever 270 can also lockingly engage the opposite side 202b of the bar. For example, the lower edge 280a about opening 278 can become pressed against this side 202b of the bar 202.

To release the carrier 220 from the position as illustrated, the lever is moved downwardly, which increases the spacing of between the corners 280 and 280a and the corresponding sides of the bar 202, thereby permitting the carrier to be reoriented to a new desired position.

Figure 20:
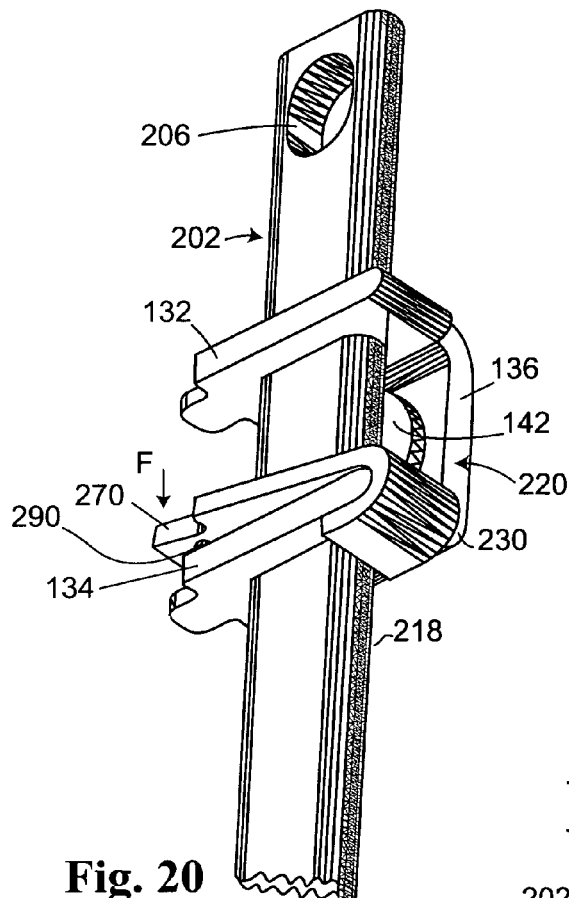
FIG. 20 is a rear isometric view of an alternate embodiment of the invention.

Reference is briefly made to FIG. 20, which is a rear isometric view of another embodiment of the invention. In this embodiment the locking lever 270 has been removed from the top 132 of the carrier 220 and placed about the bottom 134 of the carrier yielding a more compact design. As can be seen, the locking lever is positioned spatially generally within the confines of the carrier 220.

Many changes and modifications in the above-described embodiment of the invention can, of course, be carried out without departing from the scope thereof. Accordingly, that scope is intended to be limited only by the scope of the appended claims.

The invention claimed is:

1. A height adjuster (100, 200, 400) for a seat belt system comprising:
   a mounting bar (102, 202, 402) adapted to be mounted to a portion of a vehicle or seat, the mounting bar having at least one side wall;
   a carrier (120, 220, 460, 460a) slidably mounted to the bar and movable along the bar to various positions, the carrier being generally U-shaped in cross-section and having a top and bottom wall and a center or front wall, the top and bottom wall each including a first opening through which the mounting bar extends;
   a spring loaded, locking lever (170, 270, 490) movable from a locked position to a free position, the locking lever including a base end operatively cooperating with a portion of the carrier,
   the locking lever including an activation arm with a lock opening extending through the activation arm, the lock opening configured to receive the mounting bar, the locking lever including a first lock edge formed on a corner of the locking lever at the lock opening, the lock edge engagable with the mounting bar when the locking lever is in the locked position;
   the locking lever being biased to the locked position by a bias spring, and when the locking lever is in the free position the first lock edge is disengaged from the mounting bar; and
   a friction coupling operatively linked to the carrier, the bar, and to the locking lever, configured to move the locking lever to its free position, to substantially decouple the locking lever from the bar, when the carrier is moved upward relative to the bar without need of manual intervention to move the locking lever to its free position.

2. The height adjuster as defined in claim 1 wherein the friction coupling includes a hollow member received about the bar and movable with the carrier in a first direction relative to the bar, the friction coupling is movable onto the locking lever upon movement of the carrier in an upward direction.

3. The height adjuster as defined in claim 2 wherein the locking lever includes a base end and the activation arm, wherein the base end is one of flat and curved.

4. The height adjuster as defined in claim 1 wherein the friction coupling is chosen from a group of material including: polyurethene, nitrile, butyl latex, pure gum, styrene-butadiene, neoprene, epichlorohydrin, EPD, Santoprene, Hytrel, vinyl and viton rubber.

5. The height adjuster as defined in claim 1 wherein the friction coupling has a hardness in the range of Shore A 35 to about Shore A 85.

6. The height adjuster as defined in claim 1 wherein the carrier (460) includes a side wall (472) and wherein a portion of the side wall is remote from the bottom wall (464) of the carrier defining a pivot slot (474) and wherein a flat base end of the locking lever is operatively received within the pivot slot.

7. The height adjuster as defined in claim 6 wherein the bottom wall (464) includes an extending portion (464a) positioned adjacent the pivot slot and which functions as a mechanical stop to prevent the locking lever from sliding into the pivot slot.

8. The height adjuster as defined in claim 1 wherein the bias spring is positioned between the bottom wall of the carrier and the activation arm of the locking lever.

9. The height adjuster as defined in claim 8 wherein the bias spring is one of a helical spring and a leaf spring.

10. The height adjuster as defined in claim 1 wherein the carrier (460) includes a side wall (472) and wherein a portion of the side wall is remote from the bottom wall (464) of the carrier defining a pivot slot (474) and wherein a flat base end of the locking lever is operatively received within the pivot slot and wherein the bias spring includes a leaf spring operatively biasing an underside of the locking lever and wherein the leaf spring includes an extension (736) to operatively close the pivot slot.

11. The height adjuster as defined in claim 1 wherein the carrier (460) includes a side wall (472) wherein this side wall is bifurcated defining a pivot slot (474) and wherein the flat base end of the locking lever is pivotally received within the pivot slot.

12. The height adjuster as defined in claim 1 wherein the mounting bar includes one of an oval cross section and a triangular-like cross section.

13. The height adjuster as defined in claim 1 wherein the mounting bar includes at least one engagement surface.

14. The height adjuster as defined in claim 13 wherein the at least one engagement surface is one of a smooth and generally contiguous locking teeth (418).

15. The height adjuster as defined in claim 13 wherein a lock edge of the locking lever is movable into and out of engagement with the engagement surface.

16. The height adjuster as defined in claim 1 wherein opposite interior edges of the friction coupling are chamfered.

17. A height adjuster (100, 200, 400) for a seat belt system comprising:
   a mounting bar (102, 202, 402) adapted to be mounted to a portion of a vehicle or seat, the mounting bar having at least one side wall;
   a carrier (120, 220, 460, 460a) slidably mounted to the bar and movable along the bar to various positions, the carrier having a top and bottom wall and a center or front wall, the top and bottom wall each including a first opening through which the mounting bar extends;
   a spring loaded, locking lever (170, 270, 490) movable from a locked position to a free position, the locking lever including a base end operatively cooperating with a portion of the carrier,
   the locking lever including an activation arm with a lock opening extending through the activation arm, the lock opening configured to receive the mounting bar, the locking lever including a first lock edge at the lock opening, the lock edge engagable with the mounting bar when the locking lever is in the locked position;
   the locking lever being biased to the locked position by a bias spring, and when the locking lever is in the free position the first lock edge is disengaged from the mounting bar; and
   a friction coupling operatively linked to the carrier, the bar, and to the locking lever configured to move the locking lever to its free position, to substantially decouple the locking lever from the bar, when the carrier is moved upward relative to the bar without need of manual intervention to move the locking lever to its free position.

18. A height adjuster (100, 200, 400) for a seat belt system comprising:
   a mounting bar (102, 202, 402) adapted to be mounted to a portion of a vehicle or seat, the mounting bar having at least one side wall;
   a carrier (120, 220, 460, 460a) slidably mounted to the bar and movable along the bar to various positions, the carrier having a top and bottom wall and a center or front wall, the top and bottom wall each including a first opening through which the mounting bar extends;
   a spring loaded, locking lever (170, 270, 490) movable from a locked position to a free position, the locking lever including a base end operatively cooperating with a portion of the carrier,
   the locking lever including an activation arm with a lock opening extending through the activation arm, the lock opening configured to receive the mounting bar, the locking lever including a first lock edge at the lock opening, the lock edge engagable with the mounting bar when the locking lever is in the locked position;
   the locking lever being biased to the locked position by a bias spring, and when the locking lever is in the free position the first lock edge is disengaged from the mounting bar; and
   a friction coupling operatively linked to the carrier, the bar, and to the locking lever configured to move the locking lever to its free position, to substantially decouple the locking lever from the bar, when the carrier is moved upward relative to the bar without need of manually moving the locking lever to its free position.

* * * * *